United States Patent [19]

Misawa et al.

[11] Patent Number: 5,418,765
[45] Date of Patent: May 23, 1995

[54] APPARATUS FOR RECORDING AND REPRODUCING OPTICAL INFORMATION HAVING AN OPTICAL WAVEGUIDE

[75] Inventors: Shigeyoshi Misawa, Tokyo; Kiyoshi Yokomori; Masahiko Nakayama, both of Yokohama, all of Japan

[73] Assignee: Ricoh Company, Ltd., Tokyo, Japan

[21] Appl. No.: 188,944

[22] Filed: Jan. 27, 1994

Related U.S. Application Data

[63] Continuation of Ser. No. 867,124, Apr. 10, 1992, abandoned.

[30] Foreign Application Priority Data

Apr. 19, 1991 [JP] Japan .................................. 3-088652
Jun. 18, 1991 [JP] Japan .................................. 3-146061

[51] Int. Cl.⁶ .............................................. G11B 7/09
[52] U.S. Cl. .............................. 369/44.12; 369/44.23; 369/112; 369/121; 385/14; 385/36; 385/130
[58] Field of Search ................... 385/14, 36, 130, 132; 359/833; 369/44.12, 44.23, 112, 121, 122; 250/201.5

[56] References Cited

U.S. PATENT DOCUMENTS

| | | |
|---|---|---|
| 4,545,642 | 10/1985 | Auracher et al. . |
| 4,565,422 | 1/1986 | Seymour et al. . |
| 4,637,684 | 1/1987 | Tomita et al. . |
| 4,653,844 | 3/1987 | Ward . |
| 4,815,059 | 3/1989 | Nakayama et al. . |
| 4,832,428 | 5/1989 | Miyawaki et al. . |
| 4,861,128 | 8/1989 | Ishikawa et al. . |
| 4,876,680 | 10/1989 | Misawa et al. ............. 369/110 |
| 4,877,301 | 10/1989 | Yokomori et al. . |
| 4,932,743 | 6/1990 | Isobe et al. . |
| 4,945,527 | 7/1990 | Sunagawa ................. 369/44.12 |
| 4,971,414 | 11/1990 | Funato et al. .......... 369/44.12 X |
| 4,978,187 | 12/1990 | Minemura et al. . |
| 4,991,160 | 2/1991 | Premji ....................... 369/44.12 |
| 5,091,982 | 2/1992 | Yokomori et al. . |
| 5,095,389 | 3/1992 | Yokomori ................... 359/833 |
| 5,119,452 | 6/1992 | Yokomori et al. ............. 385/36 |
| 5,195,071 | 3/1993 | Funato et al. ............ 369/109 X |
| 5,208,800 | 5/1993 | Isobe et al. ................... 369/112 |
| 5,235,589 | 8/1993 | Yokomori et al. ............. 369/112 |

FOREIGN PATENT DOCUMENTS

| | | |
|---|---|---|
| 63-61430 | 3/1988 | Japan . |
| 64-4706 | 1/1989 | Japan . |
| 64-4707 | 1/1989 | Japan . |

OTHER PUBLICATIONS

Morio Kobayashi et al., "An optical waveguide TE-TM mode splitter", Appl. Phys. Lett. 32(5), Mar. 1, 1978, pp. 300–302.

*Primary Examiner*—W. R. Young
*Attorney, Agent, or Firm*—Cooper & Dunham

[57] ABSTRACT

A focal point position detector has a light source for emitting light; an optical system for converging light from the light source to an optical recording medium; a coupler for coupling light from the optical recording medium thereto; a waveguide concave mirror for converging light from the coupler; a waveguide convex mirror for slightly reducing a converging degree of light from the waveguide concave mirror; and photodetectors for receiving light from the waveguide convex mirror, The coupler, the waveguide concave and convex mirrors and the photodetectors are integrally formed on a substrate, An apparatus for recording and reproducing optical information has a light source; an optical system for converging light emitted from the light source; an optical waveguide; a coupler for coupling the converged light to the optical waveguide; two waveguide mirrors arranged such that reflected light from the coupler is continuously reflected on the waveguide mirrors; and a photodetector for detecting the light reflected on the waveguide mirrors. The coupler, the optical waveguide, the waveguide mirrors and the photodetector are integrally formed on the same substrate.

14 Claims, 14 Drawing Sheets

APPARATUS FOR RECORDING AND REPRODUCING OPTICAL INFORMATION HAVING AN OPTICAL WAVEGUIDE

This is a continuation of application Ser. No. 07/867,124 filed Apr. 10, 1992, now abandoned.

BACKGROUND OF THE INVENTION

1. Field of the Invention

The present invention relates to a focal point position detector used in an apparatus for recording and reproducing optical information such as an optical disk drive unit. The present invention also relates to an apparatus for recording and reproducing optical information and having an optical pickup of a waveguide type.

2. Description of the Related Art

Recently, an optical recording medium such as an optical disk has been widely used as a medium for recording an image signal, a sound signal, etc. A signal is recorded on this optical recording medium in the shapes of a pit and a difference in reflectivity, etc. and is read by an optical pickup. This optical pickup detects existence and nonexistence of the above pit by irradiating light such as a laser beam onto a surface of the optical recording medium and detecting an intensity level of light reflected on the recording medium.

Such an optical pickup reads recording information as mentioned above and has a function for detecting a tracking error. In this tracking error detecting function, the optical pickup detects whether the irradiating position of a light beam for detecting a pit is shifted onto a right-hand or left hand side from a tracking center of a series of predetermined pits. The optical pickup further has a function for detecting a focusing error. In this focusing error detecting function, the optical pickup detects whether a focal point of the above light beam is located near or distant from a reflecting face of the optical recording medium.

Namely, tracking and focusing controls are performed to correctly irradiate the light beam onto a predetermined track such that tracking and focusing error detecting signals are canceled. Further, the tracking and focusing error signals are used to correctly focus the light beam on the reflecting face of the optical recording medium. A push-pull method, a heterodyne method, a time difference detecting method, etc. are generally known as a tracking error detecting method. An astigmatic method, critical angle detecting method, a Foucault method, etc. are known as a focusing error detecting method.

To fulfill the above functions, the general optical pickup has a beam splitter for separating a light beam reflected on the optical recording medium from a light beam irradiated toward this medium. The general optical pickup also has a lens for converging this reflected light beam in the vicinity of a photodetector such as a photodiode. Further, the general optical pickup has a small optical element such as a prism for detecting tracking and focusing errors.

However, precise processing is required with respect to such a small optical element. Further, it is complicated to adjust mutual positions of the constructional elements when the optical pickup is assembled. Accordingly, the optical pickup using such optical elements is inevitably expensive. Further, such an optical pickup is large-sized and heavy in weight so that it is not advantageous to make a reader compact and light in weight and reduce an access time.

To solve the above problems, there are various kinds of general trials for simplifying the construction of the optical pickup by using a special optical element such as an aspherical lens. However, such an optical element is particularly expensive. Accordingly, cost of the optical pickup using such a special optical element is approximately similar to that of the above general optical pickup although the structure of the optical pickup is simplified.

To solve such problems, Japanese Patent Application Laying Open (KOKAI) No. 63-61430 proposes an optical pickup having one optical waveguide element provided with a convergent diffraction grating. This optical waveguide element functions as the beam splitter, the lens and the prism mentioned above.

Japanese Patent Application Laying Open (KOKAI) No. 63-61430 shows an apparatus for recording and reproducing optical information such as an optical disk drive unit. In such an apparatus, an optical signal is recorded and reproduced from an optical recording medium by the optical pickup. Further, this optical pickup also detects a focal point error signal and a tracking error signal.

In the above optical pickup, a light beam coupled to an optical waveguide layer is converged by convergent grating couplers. Accordingly, the position of a focal point of the light beam is greatly changed in accordance with a change in wavelength of light from a light source so that it is impossible to detect the focal point error signal. Further, the convergent grating couplers function as both a waveguide coupler and a convergent optical system for a waveguide so that a degree of freedom with respect to the arrangement of an optical system is small.

SUMMARY OF THE INVENTION

It is therefore a first object of the present invention to provide a focal point position detector for reducing a change in focal point error signal and a change in coupling efficiency of a waveguide caused by a change in wavelength of light from a light source, and increasing a degree of freedom with respect to the arrangement of an optical system to make the optical system compact.

A second object of the present invention is to provide an apparatus for recording and reproducing optical information and having an optical pickup of a waveguide type including a focal point position detector in which no operation of the focal point position detector is greatly influenced by a change in wavelength of light from a light source and the focal point position detector is stably operated.

A third object of the present invention is to provide an apparatus for recording and reproducing optical information and using a focal point position detecting system for reducing a change in position of a focal point caused by a wavelength modulation of light from a light source, and increasing a degree of freedom with respect to the arrangement of an optical system to make the optical system compact.

In accordance with a first structure of the present invention, the above first object can be achieved by a focal point position detector comprising a light source for emitting light; an optical system for converging light from the light source to an optical recording medium; a coupler for coupling light from the optical recording medium thereto; a waveguide concave mirror for converging light from the coupler; a waveguide convex mirror for slightly reducing a converging degree of light from the waveguide concave mirror; and photodetectors for receiving light from the waveguide convex mirror. The focal point position detector is constructed such that the coupler, the waveguide concave and convex mirrors and the photodetectors are integrally formed on a substrate.

In accordance with a second structure of the present invention, two sets of the waveguide concave and convex mirrors and two sets of the photodetectors are symmetrically arranged to simultaneously detect a tracking error signal and a focal point error signal in the focal point position detector having the first structure.

In accordance with a third structure of the present invention, the coupler in the focal point position detector having the first structure is constructed as a coupling section for coupling light from the optical recording medium to an optical waveguide layer and converging the light coupled and wave-guided by the optical waveguide layer onto the waveguide concave mirror. The coupling section is constructed such that the optical waveguide layer, a gap adjusting layer having a refractive index lower than that of the optical waveguide layer, and a partially removed metallic layer are laminated with each other, and a prism having a refractive index higher than that of the optical waveguide layer is adhered to the laminated layers through an adhesive layer having a refractive index higher than that of the optical waveguide layer.

In accordance with a fourth structure of the present invention, the metallic layer in the focal point position detector having the third structure is constructed as a clad layer composed of a dielectric layer having a refractive index lower than that of the optical waveguide layer.

In the first structure of the present invention, light is emitted from the light source and is converged to the optical recording medium by the optical system. Light from the optical recording medium is coupled to the coupler. Light from this coupler is converged onto the waveguide concave mirror and a converging degree of this light is slightly reduced by the waveguide convex mirror, thereby receiving this light by the photodetectors.

In the second structure of the present invention, a tracking error signal and a focal point error signal are simultaneously detected by two sets of waveguide concave and convex mirrors and two sets of photodetectors.

In the third structure of the present invention, the coupler in the focal point position detector having the first structure is replaced with a coupling section. The coupling section is constructed such that the optical waveguide layer, a gap adjusting layer having a refractive index lower than that of the optical waveguide layer, and a partially removed metallic layer are laminated with each other, and a prism having a refractive index higher than that of the optical waveguide layer is adhered to the laminated layers through an adhesive layer having a refractive index higher than that of the optical waveguide layer. In this third structure, light from the optical recording medium is stably coupled to the optical waveguide layer with high position accuracy and is wave-guided by this optical waveguide layer. This coupled and wave-guided light is converged by the waveguide concave mirror.

In the fourth structure of the present invention, the metallic layer in the focal point position detector having the third structure is replaced with a clad layer composed of a dielectric layer having a refractive index lower than that of the optical waveguide layer. Accordingly, waveguide loss is reduced when light is waveguided by this clad layer.

In accordance with a fifth structure of the present invention, the above second object can be achieved by an apparatus for recording and reproducing optical information and having an optical pickup, the optical pickup comprising a light source; an optical system for converging light from the light source to an optical information recording medium; an optical waveguide; a coupler for coupling return light reflected on the optical information recording medium to the optical waveguide; two sets of waveguide mirror pairs for converging waveguide light from the coupler; and photodetectors for receiving light from each of the two sets of waveguide mirror pairs. The optical pickup is constructed such that the two sets of waveguide mirror pairs are of the same type and are arranged in parallel with each other, and the coupler, the optical waveguide, the waveguide mirrors and the photodetectors are integrally formed on a substrate.

In accordance with a sixth structure of the present invention, a focal point position detecting signal, a tracking error signal and a recording signal are simultaneously detected by the two sets of waveguide mirror pairs and the photodetectors in the above apparatus for recording and reproducing optical information and having the fifth structure.

In the apparatus for recording and reproducing optical information and having each of the fifth and sixth structures of the present invention, light is emitted from the light source and is converged to the optical information recording medium through the optical system. Return light reflected on the optical information recording medium is coupled to the optical waveguide by the coupler. Waveguide light from the coupler is divided into two light portions by the two sets of waveguide mirror pairs of the same type arranged in parallel with each other. The two light portions are converged by these waveguide mirrors and are respectively received by the photodetectors. Accordingly, in the optical information recording and reproducing apparatus of the present invention, a shift in position of a converging point caused by a change in waveguide of light from the light source and an influence of this shift on a focal point error signal can be reduced in comparison with the general optical information recording and reproducing apparatus using a grating coupler for converging light.

Further, the two sets of waveguide mirror pairs of the same type are arranged as a waveguide optical system in parallel with each other. No distance between the focal points of two light beams caused by an error in forming position of each of the waveguide mirrors is easily changed in comparison with an optical arrangement with axial symmetry as in the general optical information recording and reproducing apparatus mentioned above. Accordingly, an offset as a shift in position of an origin in the optical system is reduced in comparison with the general optical information recording and reproducing apparatus when a focal point error signal is detected. Therefore, it is possible to increase a tolerance for the error in forming position of each of the waveguide mirrors.

The above third object of the present invention can be achieved by an apparatus for recording and reproducing optical information, comprising a light source; an optical system for converging light emitted from the light source; an optical waveguide; a coupler for coupling the converged light to the optical waveguide; two waveguide mirrors arranged such that reflected light from the coupler is continuously reflected on the waveguide mirrors; and a photodetector for detecting the light reflected on the waveguide mirrors. The coupler, the optical waveguide, the waveguide mirrors and the photodetector are integrally formed on the same substrate. The two waveguide mirrors may be constructed by waveguide parabolic and elliptical mirrors. The waveguide mirrors may be constructed such that the light from the coupler is divided by the waveguide mirrors into two light portions and these two light portions are parallel to each other.

In this optical information recording and reproducing apparatus, it is possible to use a focal point position detecting system for reducing a change in position of a focal point caused by a wavelength modulation of light from a light source, and increasing a degree of freedom with respect to the arrangement of an optical system to make the optical system compact.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a detector for detecting the position of a focal point and an apparatus for recording and reproducing optical information in the present invention will next be described in detail with reference to the accompanying drawings.

Figure 1:
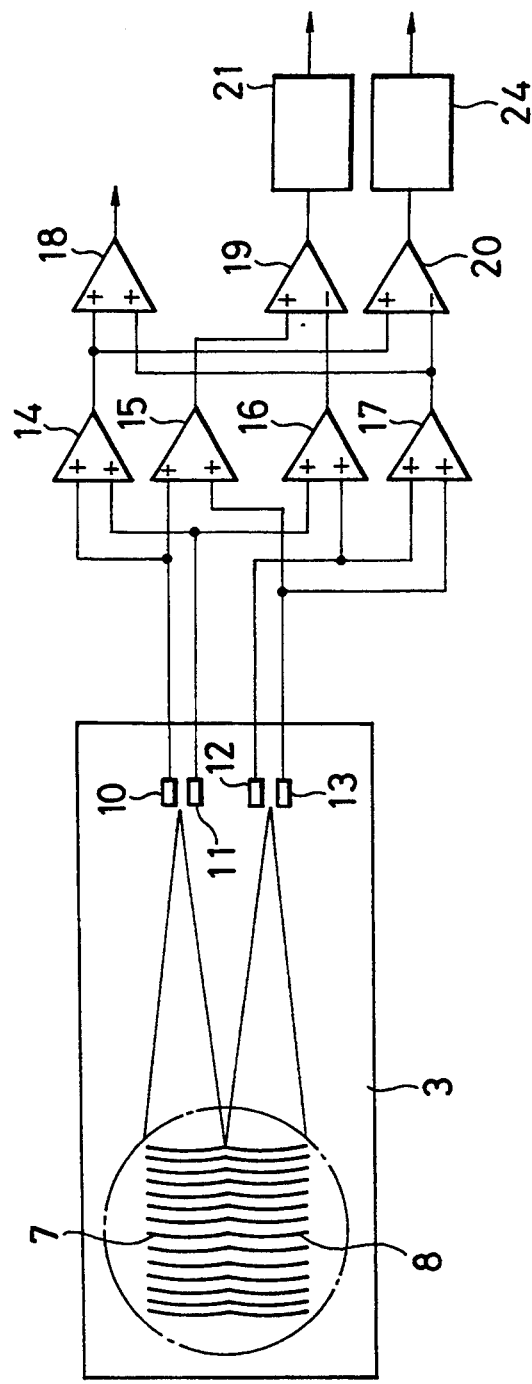
FIG. 1 is a view partially showing a general apparatus for recording and reproducing optical information.
Figure 2:
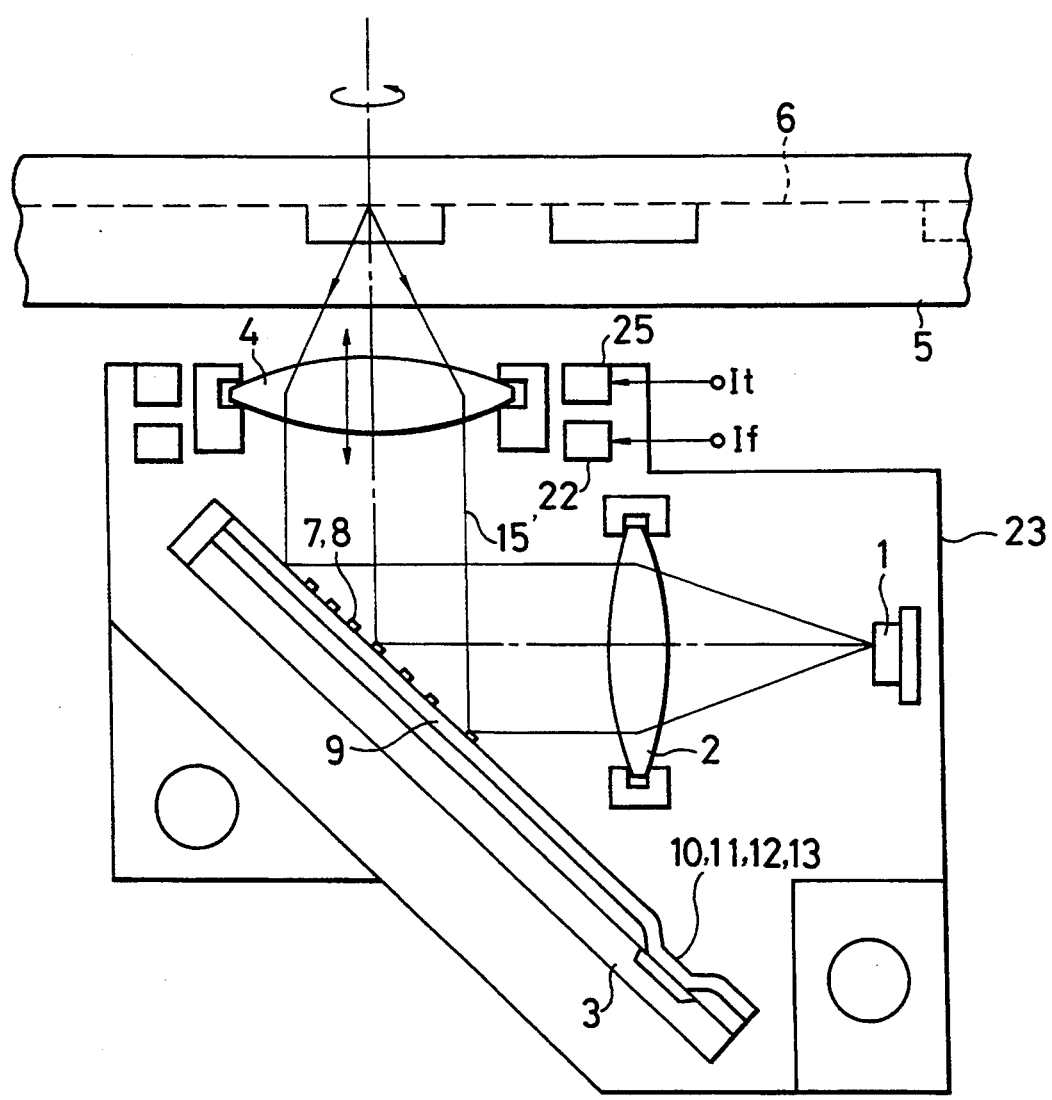
FIG. 2 is a side view showing this general apparatus for recording and reproducing optical information.

FIGS. 1 and 2 show one example of a general optical pickup.

In FIG. 2, light is emitted from a semiconductor laser 1 and is changed to parallel light by a collimator lens 2. The parallel light is reflected on a waveguide element 3 and is irradiated by an objective lens 4 onto a recording layer 6 formed on a substrate 5. Light reflected on the recording layer 6 again passes through the objective lens 4 and is incident to convergent grating couplers 7 and 8 formed on the waveguide element 3. The incident light is then coupled to an optical waveguide layer 9 of the waveguide element 3.

As shown in FIG. 1, the light coupled to the optical waveguide layer 9 by the convergent grating couplers 7 and 8 is divided into two light portions by the convergent grating couplers 7 and 8 and is then converged. The converged divisional light portions are respectively incident to a center of a first set of photodetectors 10 and 11 and a center of a second set of photodetectors 12 and 13.

In the following description, output signals of the photodetectors 10, 11, 12 and 13 are respectively set to A, B, C and D. Adding and subtracting operations with respect to these output signals A to D are respectively performed by adders 14 to 18 and subtracters 19 and 20 to detect a focal point error signal $\Delta F$, a tracking error signal $\Delta T$ and a recording signal $S$.

The focal point error signal $\Delta F$ is represented as follows.

$$\Delta F = (A+D) - (B+C)$$

The tracking error signal $\Delta T$ is represented as follows.

$$\Delta T = (A+B) - (C+D)$$

The recording signal S is represented as follows.

$S = A + B + C + D$

The focal point error signal ΔF is detected by using a Foucault method. The tracking error signal ΔT is detected by using a push-pull method. A focusing coil driving control circuit 21 drives an actuator 22 by an electric current If according to the focal point error signal ΔF. The actuator 22 moves the objective lens 4 to control a focusing operation of the optical pickup. A tracking coil driving control circuit 24 drives an actuator 25 by an electric current It according to the tracking error signal ΔT. The actuator 25 moves the objective lens 4 or an entire optical pickup 23 to control a tracking operation of the optical pickup.

In the above optical pickup, a light beam coupled to the optical waveguide layer 9 is converged by the convergent grating couplers 7 and 8. Accordingly, the position of a focal point of the light beam is greatly changed in accordance with a change in wavelength of light from the light source 1 so that it is impossible to detect the focal point error signal. Further, the convergent grating couplers 7 and 8 function as both a waveguide coupler and a convergent optical system for a waveguide so that a degree of freedom with respect to the arrangement of an optical system is small.

In a general practical apparatus for recording and reproducing optical information, an optical information recording medium such as an optical disk and a magnetooptic disk is used as an information recording medium for recording an image signal, a sound signal, etc. For example, an optical pickup using an optical waveguide or a waveguide element is proposed in such an optical information recording and reproducing apparatus (see Japanese Patent Application Laying Open (KOKAI) No. 63-61430, etc.).

Figure 3:
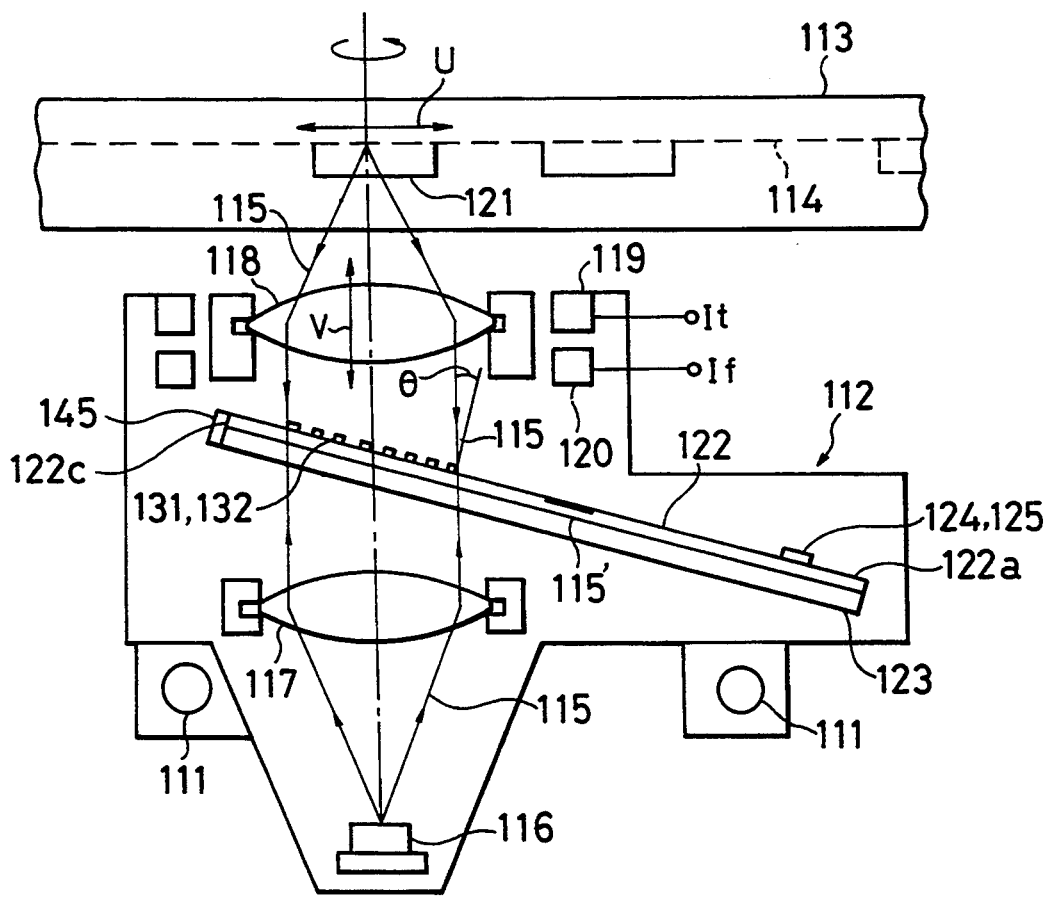
FIG. 3 is a side view showing one example of a general optical pickup.

FIG. 3 shows another example of the general optical pickup using an optical waveguide.

In FIG. 3, light 115 is emitted from a light source 116 and is transmitted through a collimator lens 117 and a transparent substrate 123. This light 115 is then converged onto a recording medium face 114 on an optical disk 113 through an objective lens 118. Return light 115' reflected on the recording medium face 114 again passes through the objective lens 118 and is changed to converged light by this objective lens. This light is incident to two divisional convergent grating couplers 131 and 132 formed on the transparent substrate 123. The incident light is then diffracted and coupled to an optical waveguide layer 122 formed on the transparent substrate 123. A subsequent operation of this optical pickup is similar to that shown in FIG. 1.

In the above general optical pickup, similar to the optical pickup shown in FIGS. 1 and 2, a light beam coupled to the optical waveguide layer 122 is converged by the convergent grating couplers 131 and 132. Accordingly, the position of a focal point of the light beam is greatly changed in accordance with a change in wavelength of light from the light source 116 so that it is impossible to detect a focal point error signal. Further, the convergent grating couplers 131 and 132 function as both a waveguide coupler and a convergent optical system for a waveguide so that a degree of freedom with respect to the arrangement of an optical system is small.

Figure 4:
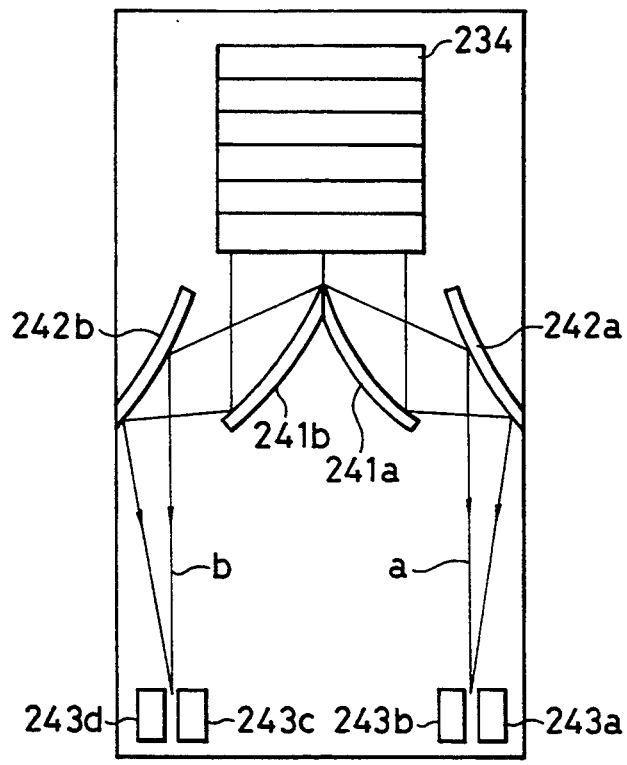
FIG. 4 is a plan view showing a focal point position detector in accordance with a first embodiment of the present invention.
Figure 5:
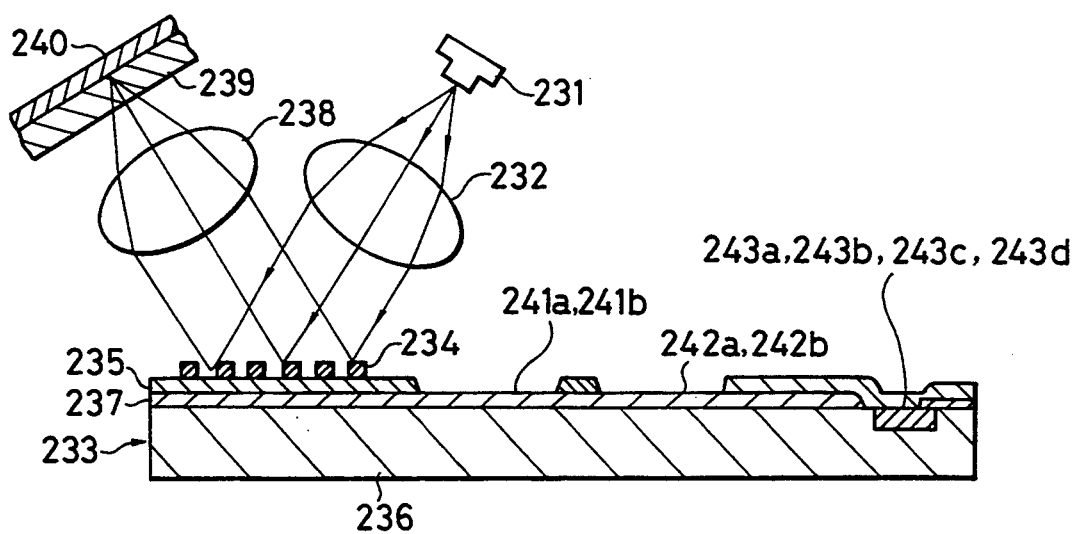
FIG. 5 is a cross-sectional view of the focal point position detector in the first embodiment of the present invention.

FIGS. 4 and 5 show a focal point position detector in accordance with a first embodiment of the present invention.

In this first embodiment, a tracking error signal and a focal point error signal are simultaneously detected in an apparatus for recording and reproducing optical information such as an optical disk driving unit. Light is emitted from a light source 231 and is changed to parallel light by a collimator lens 232. The parallel light is incident to a grating coupler 234 of a waveguide element 233. The incident light is then reflected on a surface of an optical waveguide layer 235 in the waveguide element 233 and is also reflected on a boundary face between a substrate 236 and a buffer layer 237. This reflected light is converged by an objective lens 238 onto an optical recording medium 240 through a transparent substrate 239.

The transparent substrate 239 and the optical recording medium 240 are integrated with each other and are rotated by a motor. The transparent substrate 239 and the optical recording medium 240 are approximately moved by a driving means in a radial direction of the optical recording medium 240 such as an optical disk so that the light from the objective lens 238 follows a track of the optical recording medium 240. The light reflected on the optical recording medium 240 again passes through the objective lens 238 and is converged and changed to parallel light by this objective lens. This parallel light is then coupled to the optical waveguide layer 235 by the grating coupler 234 on the waveguide element 233.

The parallel light coupled to the optical waveguide layer 235 by the grating coupler 234 is wave-guided by the optical waveguide layer 235 and is divided into two light portions by waveguide parabolic mirrors 241a and 241b. These two light portions are then reflected on the waveguide parabolic mirrors 241a and 241b. The waveguide parabolic mirrors 241a and 241b are constructed by one set or pair of concave mirrors each having a parabolic mirror face. The lights reflected on the waveguide parabolic mirrors 241a and 241b are respectively incident to waveguide hyperbolic mirrors 242a and 242b as converged light beams.

The waveguide hyperbolic mirrors 242a and 242b are constructed by one set or pair of convex mirrors each having a hyperbolic mirror face. Converging degrees of the converged light beams from the waveguide parabolic mirrors 241a and 241b are respectively reduced slightly by the waveguide hyperbolic mirrors 242a and 242b. These light beams are then converged to a central portion of one set or pair of photodetectors 243a and 243b and a central portion of another set or pair of photodetectors 243c and 243d.

The buffer layer 237, the optical waveguide layer 235, the grating coupler 234, the waveguide parabolic mirrors 241a, 241b, the waveguide hyperbolic mirrors 242a, 242b and the photodetectors 243a to 243d are integrally formed on the substrate 236. The waveguide parabolic mirrors 241a, 241b, the waveguide hyperbolic mirrors 242a, 242b and the photodetectors 243a to 243d are symmetrically formed on the right-hand and left-hand sides in FIG. 4. The photodetectors 243a and 243b are arranged as a pair in parallel with each other and the photodetectors 243c and 243d are also arranged as a pair in parallel with each other.

The light source 231 desirably has large or good spatial and time coherences and may be constructed by a semiconductor laser, various kinds of gas lasers, a solid laser, a light emitting diode, etc. Each of the collimator lens 232 and the objective lens 238 is constructed by a lens of a normal type, but may be constructed by combining lenses with each other. Further, each of the collimator lens 232 and the objective lens 238 may be constructed by combining an aspherical lens, a Fresnel lens, a distributing refractive index lens and other lenses with each other.

The grating coupler 234 is of an equal distance loading type, but may be formed in a curving shape at an unequal distance. Further, the grating coupler 234 may be of a blazing type or a volume phase type instead of the loading type. A trapezoidal prism coupler can be also used instead of the grating coupler 234. In this case, no diffraction efficiency is reduced by a change in wavelength of light from the light source 231 and no optimum incident angle of light incident to the waveguide element 233 is changed.

In this first embodiment, the substrate 236 of the waveguide element 233 is constructed by a semiconductor substrate made of silicon, GaAs, etc. However, this substrate 236 may be constructed by a dielectric substance such as ceramics, glass, an organic material such as plastic resin, etc. The buffer layer 237 and the optical waveguide layer 235 are formed by processing a transparent material at a wavelength of light emitted from the light source 231 using methods of evaporation, sputtering, CVD, coating, oxidation, diffusion, etc. It is necessary to set a refractive index of the buffer layer 237 to be lower than that of the optical waveguide layer 235. No buffer layer 237 is necessarily required if no loss of light caused by the substrate 236 is considered.

The photodetectors 243a to 243d are manufactured by using impurity diffusion, ion implantation, etc. However, each of the photodetectors 243a to 243d may be constructed by a photodiode of a Schottky type. An α-Si photodiode can be used as each of the photodetectors 243a to 243d when no substrate 236 is constructed by a semiconductor substrate. The waveguide parabolic mirrors 241a and 241b and the waveguide hyperbolic mirrors 242a and 242b can be formed by removing unnecessary portions from only the optical waveguide layer 235, or the optical waveguide layer 235 and a portion of the buffer layer 237 using dry and wet etching, and cutting methods, etc. Otherwise, the waveguide parabolic mirrors 241a and 241b and the waveguide hyperbolic mirrors 242a and 242b can be formed by diffusing a material having a low refractive index.

When the waveguide parabolic mirrors 241a and 241b and the waveguide hyperbolic mirrors 242a and 242b are formed by removing the above unnecessary portions, an end face of each of these mirrors may come in direct contact with an air layer. Otherwise, this end face may be coated with a metal having a high reflectivity, etc. Further, a material having a refractive index lower than that of the optical waveguide layer 235 may be formed on this end face.

In this first embodiment, a tracking error signal and a focal point error signal are detected as follows.

As shown in FIG. 4, when the optical recording medium 240 is located in a suitable focusing position of the objective lens 238, the grating coupler 234, the waveguide parabolic mirrors 241a, 241b, the waveguide hyperbolic mirrors 242a, 242b and the photodetectors 243a to 243d are arranged such that two convergent light beams in the optical waveguide layer 235 are respectively converged to a central portion between the photodetectors 243a and 243b and a central portion between the photodetectors 243c and 243d.

Figure 7:
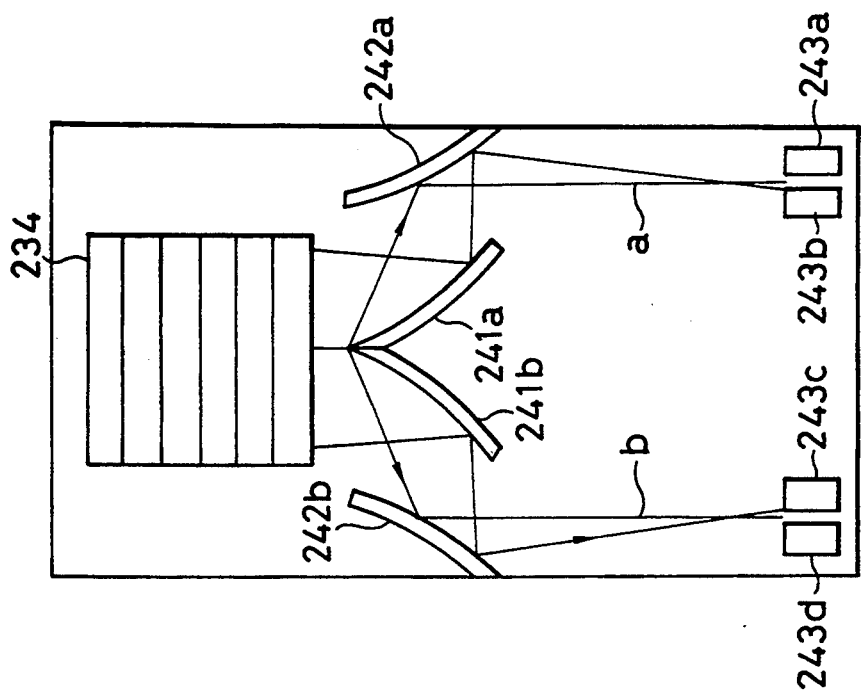
FIG. 7 is a plan view for explaining the focal point position detector in the second embodiment.

When the optical recording medium 240 located in the focusing position of the objective lens 238 is separated from the objective lens 238, a light beam incident to the waveguide element 233 is slightly converged excessively. Accordingly, as shown in FIG. 7, the positions of focal points of two light beams a and b separated in the optical waveguide layer 235 are located before the photodetectors 243a, 243b, 243c and 243d. When output signals of the photodetectors 243a, 243b, 243c and 243d are respectively set to A, B, C and D, inequalities B>A and C>D are formed. If a focal point error signal $\Delta F=(A+D)-(B+C)$ is detected by electric circuits such as the adders 15, 16 and the subtracter 19 shown in FIG. 2, an inequality $\Delta F<0$ is formed.

Figure 8:
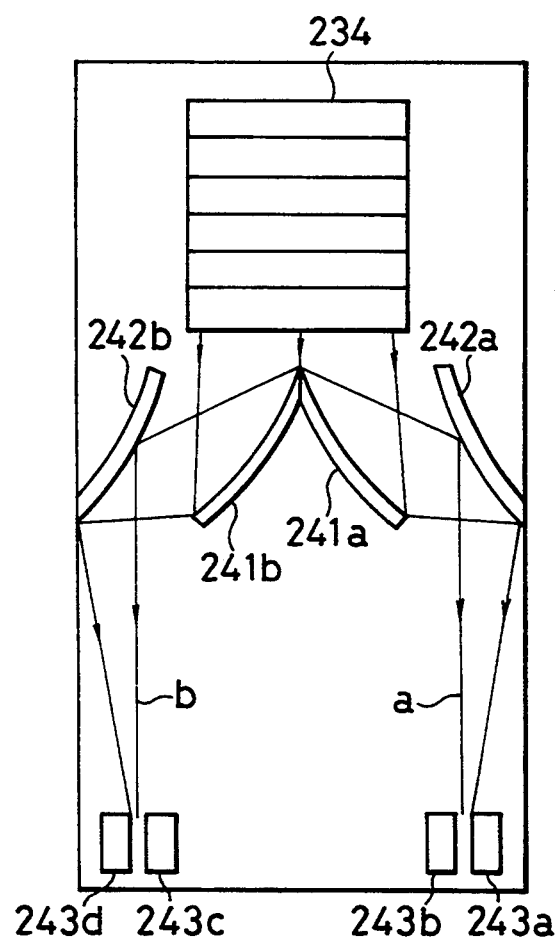
FIG. 8 is a plan view for explaining the focal point position detector in the second embodiment.

When the optical recording medium 240 approaches the objective lens 238 from the focusing position thereof, the light beam incident to the waveguide element 233 is slightly diverged excessively. Accordingly, as shown in FIG. 8, the positions of focal points of the two light beams a and b separated in the optical waveguide layer 235 are located backward from the photodetectors 243a to 243d. Therefore, inequalities A>B and D>C are formed so that $\Delta F>0$ is formed.

A=B and C=D are formed at a focusing time when the optical recording medium 240 is located in the focusing position of the objective lens 238 as shown in FIG. 4, thereby forming $\Delta F=0$.

An actuator for moving the objective lens 238 or the entire optical pickup is driven by the operation of a focusing coil driving control circuit. Accordingly, a focusing operation of the optical pickup can be controlled by moving the objective lens 238 or the entire optical pickup by this actuator in the direction of an optical axis such that $\Delta F=0$ is formed by changing the value of $\Delta F$ to a positive or negative value.

An actuator for moving the objective lens 238 and the entire optical pickup is driven by the operation of a tracking coil driving control circuit. Accordingly, if a tracking error signal $\Delta T=(A+B)-(C+D)$ is detected by electric circuits such as the adders 14, 17 and the subtracter 20 shown in FIG. 2, a tracking operation of the optical pickup can be controlled by moving the objective lens 238 or the entire optical pickup by this actuator in a tracking direction such that $\Delta T=0$ is formed by changing the value of $\Delta T$ to a positive or negative value.

A recording signal $S=(A+B+C+D)$ can be detected by electric circuits such as the adders 14, 17 and 18 shown in FIG. 2.

In this first embodiment, each of the waveguide parabolic mirrors 241a and 241b as a concave mirror is used as a first mirror. Each of the waveguide hyperbolic mirrors 242a and 242b as a convex mirror is used as a second mirror. When an optical arrangement of these mirrors is suitably selected, a parallel light beam incident to the waveguide element 233 can be converged to the respective central portions of the two sets of photodetectors 243a to 243d without spherical aberration at the focusing time of the objective lens. Accordingly, it is possible to reduce the diameter of a spot of the light beam. Therefore, it is possible to prevent the detecting sensitivity of a focal point position from being reduced by an increase in spot diameter by spherical aberration.

As shown in FIG. 4, a principal ray of the incident light beam from the grating coupler 234 is constructed by light passing through a center of this light beam. The optical system is arranged such that this principal ray is divided by the waveguide parabolic mirrors 241a and 241b into two light portions a and b parallel to each other. In such an optical arrangement, focal points of the two light beams are respectively located on the light portions a and b at any time. Accordingly, no distance between the focal points of the two light beams is approximately changed so that it is easy to correct a shift in inclination from an optical axis of the incident light beam.

In this embodiment, the parabolic mirrors 241a, 241b and the hyperbolic mirrors 242a, 242b are used as waveguide mirrors. However, if it is not necessary to completely correct spherical aberration, spherical and aspherical mirrors different from the parabolic and hyperbolic mirrors may be used. In this case, it is necessary to respectively set the first and second mirrors to concave and convex mirrors.

Figure 6:
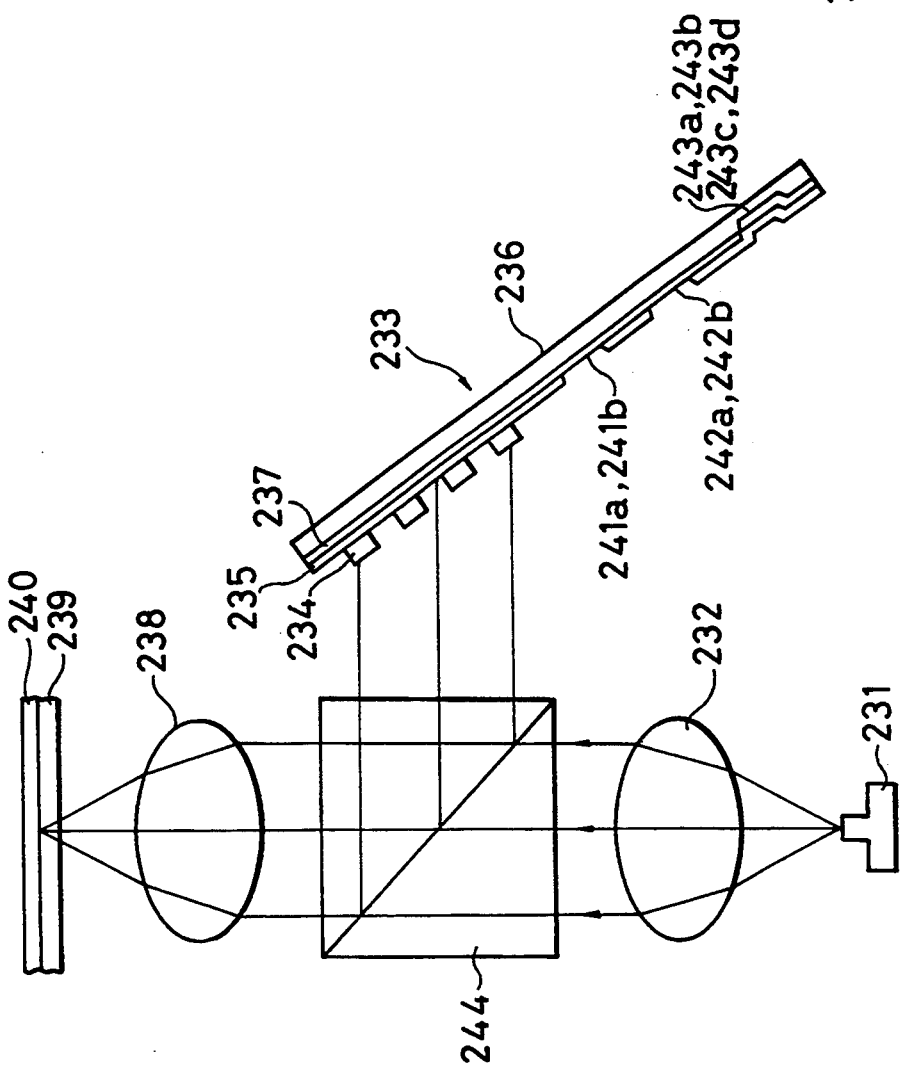
FIG. 6 is a side view showing a focal point position detector in accordance with a second embodiment of the present invention.

A focal point position detector in accordance with a second embodiment of the present invention will next be described in detail with reference to FIG. 6.

In the above first embodiment, light emitted from the light source 231 is converged and changed to parallel light by the collimator lens 232 and is once reflected on the waveguide element 233. However, in this second embodiment, light emitted from a light source 231 is changed to parallel light by a collimator lens 232 and is then incident to an objective lens 238 through a beam splitter 244. Light reflected on an optical recording medium 240 is again separated by the beam splitter 244 and is incident to a waveguide element 233. The other constructional portions are similar to those in the first embodiment. The beam splitter 244 may be of a half mirror type, or may be constructed by combining a polarizing beam splitter and a λ/4 plate with each other. In this case, light utilizing efficiency is improved in comparison with that in the first embodiment. In the second embodiment, a grating coupler 234 can be constructed by a prism coupler.

If no tracking error detecting signal is required, it is sufficient to arrange only one set of waveguide mirrors (241a, 242a) or (241b, 242b) in the waveguide element 233 in the first and second embodiments. In this case, it is also sufficient to arrange only one set of photodetectors (243a, 243b) or (243c, 243d). For example, when only the waveguide mirrors 241a, 242a and the photodetectors 243a, 243b on the right-hand side in FIG. 4 are used, a focal point detecting signal ΔF is set to ΔF=A−B and a recording signal S is set to S=A+B.

Further, it is not necessary to arrange one set or pair of photodetectors 243a and 243b in parallel with each other and arrange another set or pair of photodetectors 243c and 243d in parallel with each other. For example, these photodetectors may be arranged such that one set of photodetectors detects a portion of a light beam near a focal point and another set of photodetectors detects the remaining light beam portion. In the first embodiment shown in FIGS. 4 and 5, a waveguide hyperbolic mirror can be used as each of the first waveguide mirrors 241a and 241b when a light beam incident to the grating coupler 234 is slightly converged excessively. In contrast to this, a waveguide elliptical mirror can be used as each of the first waveguide mirrors 241a and 241b when the light beam incident to the grating coupler 234 is slightly diverged excessively. In such a case, it is possible to reduce spherical aberration of the optical system. It is preferable to use a waveguide parabolic mirror as each of the first waveguide mirrors 241a and 241b in accordance with the first embodiment when the light beam incident to the grating coupler 234 is set to parallel light. In this case, it is sufficient to use only a waveguide hyperbolic mirror as each of the second waveguide mirrors 242a and 242b.

Figure 9:
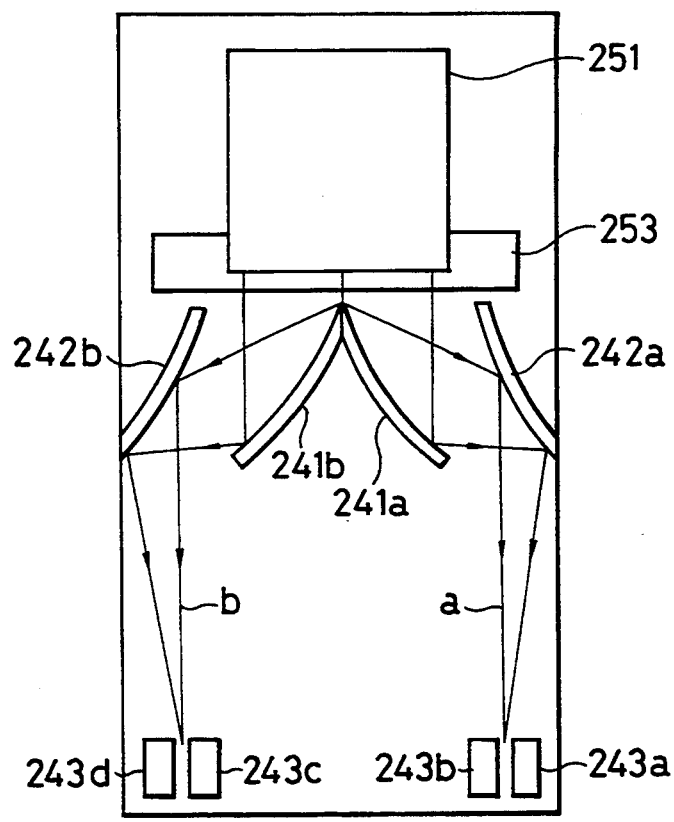
FIG. 9 is a side view showing a focal point position detector in accordance with a third embodiment of the present invention.
Figure 10:
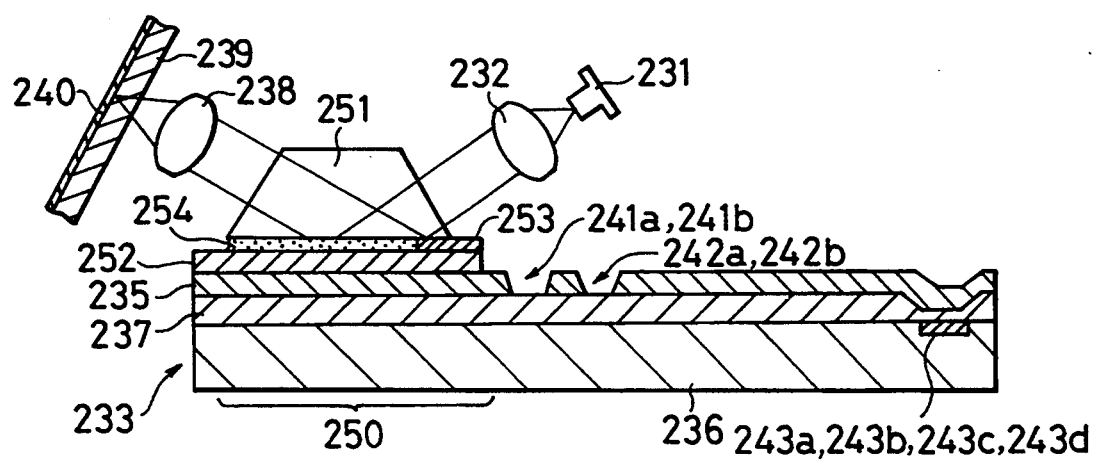
FIG. 10 is a cross-sectional view showing the focal point position detector in the third embodiment.

FIGS. 9 and 10 show a focal point position detector in accordance with a third embodiment of the present invention.

In this third embodiment, the focal point position detector has a coupling section 250. In FIGS. 9 and 10, constructional portions similar to those in the first embodiment shown in FIGS. 4 and 5 are designated by the same reference numerals.

In FIG. 10, light is emitted from a light source 231 and is changed to parallel light by a collimator lens 232. The parallel light is then incident to a prism 251 constituting the coupling section 250 formed in a portion of a waveguide element 233. This incident light is reflected on a bottom face of the prism 251. This reflected light is converged by an objective lens 238 onto an optical recording medium 240 through a transparent substrate 239. The converged light is reflected on the optical recording medium 240 and again passes through the objective lens 238 and is converged and changed to parallel light by this objective lens. The parallel light from the objective lens 238 is incident to the prism 251 and is coupled to an optical waveguide layer 235 of the coupling section 250 and is then wave-guided. The light coupled and wave-guided by this optical waveguide layer 235 is divided by waveguide parabolic mirrors 241a and 241b into two light portions and is reflected on these mirrors. Thereafter, the two divisional light portions are processed as in the first embodiment shown in FIGS. 4 and 5.

The coupling section 250 is constructed and operated as follows.

A buffer layer 237, the optical waveguide layer 235, a gas adjusting layer 252 and a metallic layer 253 are laminated with each other on a substrate 236 of the waveguide element 233. Further, the prism 251 is adhered onto the gap adjusting layer 252 through an adhesive layer 254. The metallic layer 253 is formed on only one portion of the gap adjusting layer 252 and the other portion of the metallic layer 253 is removed.

When parallel light is incident to the prism 251 through the collimator lens 232 from the light source 231, a portion of this parallel light is reflected on the bottom face of the prism 251. The other portion of the incident light is wave-guided to the optical waveguide layer 235 on the left-hand side in FIG. 10. This waveguided light is again emitted into the prism 251. This phenomenon is called decoupling. The light reflected on the bottom face of the prism 251 and the emitted light provided by the decoupling are emitted together from the prism 251 toward the objective lens 238. Namely, approximately all portions of light incident to the prism 251 are emitted to the objective lens 238.

When light reflected on the optical recording medium 240 is incident to the prism 251, a portion of this light is wave-guided to the optical waveguide layer 235 in the coupling section 250 on the right-hand side in FIG. 10. At this time, since the metallic layer 253 is arranged, this light portion is wave-guided without decoupling this light portion from the prism 251. The buffer layer 237, the optical waveguide layer 235, the gap adjusting layer 252, the adhesive layer 254, the metallic layer 253, the prism 251, the waveguide parabolic mirrors 241a, 241b, waveguide hyperbolic mirrors 242a, 242b and photodetectors 243a to 243d are integrally formed on the substrate 235. Further, the waveguide parabolic mirrors 241a, 241b, the waveguide hyperbolic mirrors 242a, 242b and the photodetectors 243a to 243d are symmetrically formed on the right-hand and left-hand sides in FIG. 9.

The prism 251, the adhesive layer 254, the optical waveguide layer 235, the gap adjusting layer 252 and the buffer layer 237 constituting the waveguide element 233 have refractive indices satisfying the following inequalities.

Refractive index of prism 251 ≈ refractive index of adhesive layer 254 > refractive index of optical waveguide layer 235 > refractive indices of gap adjusting layer 252 and buffer layer 237.

Concretely, a silicon substrate is used as the substrate 236 of the waveguide element 233. The respective constructional layers in the coupling section 250 are formed as follows.

The prism 251 is made of glass having a high refractive index such as 1.766.

The adhesive layer 254 is made of polyimide resin having a refractive index of 1.70.

The gap adjusting layer 252 is formed by an $SiO_2$ sputtering layer having a refractive index of 1.467 and a thickness of 0.52 $\mu$m.

The optical waveguide layer 235 is formed by an $SiO_2$ sputtering layer having a refractive index of 1.557 and a thickness of 1.5 $\mu$m.

The buffer layer 237 is formed by an $SiO_2$ thermal oxide film having a refractive index of 1.460 and a thickness of 1.0 $\mu$m.

The metallic layer 253 is formed by an aluminum evaporation film having a thickness of 0.2 $\mu$m.

The light source 231 is constructed by a semiconductor laser for emitting light having a wavelength of 0.790 $\mu$m. An incident angle of light on the bottom face of the prism 251 is set to 61 degrees so as to wave-guide light to the optical waveguide layer 235 in the coupling section 250. In this case, light is wave-guided in $TE_0$ mode.

The waveguide parabolic mirrors 241a, 241b and the waveguide hyperbolic mirrors 242a, 242b can be formed by removing an unnecessary portion from only the optical waveguide layer 235, or the optical waveguide layer 235 and a portion of the buffer layer 237 by using dry and wet etching, and cutting methods, etc. This unnecessary portion is shown by a hatching portion in FIG. 9. Otherwise, the waveguide parabolic mirrors 241a, 241b and the waveguide hyperbolic mirrors 242a, 242b can be formed by diffusing a material having a low refractive index. The gap adjusting layer 252 and the metallic layer 253 cover the coupling section 250, but may cover the waveguide element 233.

In this embodiment, a tracking error signal and a focal point error signal are detected as follows.

As shown in FIG. 9, when the optical recording medium 240 is located in a focusing position of the objective lens 238, the coupling section 250, the waveguide parabolic mirrors 241a, 241b, the waveguide hyperbolic mirrors 242a, 242b and the photodetectors 243a to 243d are arranged such that two convergent light beams in the optical waveguide layer 235 are respectively converged to a central portion between the photodetectors 243a and 243b and a central portion between the photodetectors 243c and 243d.

When the optical recording medium 240 located in the focusing position of the objective lens 238 is separated from the objective lens 238, a light beam incident to the waveguide element 233 is slightly converged excessively. Accordingly, the positions of focal points of two light beams a and b separated in the optical waveguide layer 235 are located before the photodetectors 243a to 243d. In this case, when output signals of the photodetectors 243a, 243b, 243c and 243d are respectively set to A, B, C and D, inequalities B > A and C > D are formed. If a focal point error signal $\Delta F = (A+D) \times (B+C)$ is detected by electric circuits such as the adders 15, 16 and the subtracter 19 shown in FIG. 2, an inequality $\Delta F < 0$ is formed.

When the optical recording medium 240 approaches the objective lens 238 from the focusing position thereof, the light beam incident to the waveguide element 233 is slightly diverged excessively. Therefore, inequalities A > B and D > C are formed so that $\Delta F > 0$ is formed.

An actuator for moving the objective lens 238 and the entire optical pickup is driven by the operation of a tracking coil driving control circuit. Accordingly, if a tracking error signal $\Delta T = (A+B) - (C+D)$ is detected by electric circuits such as the adders 14, 17 and the subtracter 20 shown in FIG. 2, a tracking operation of the optical pickup can be controlled by moving the objective lens 238 or the entire optical pickup by this actuator in a tracking direction such that $\Delta T = 0$ is formed by changing the value of $\Delta T$ to a positive or negative value.

A recording signal $S = (A+B+C+D)$ can be detected by electric circuits such as the adders 14, 17 and 18 shown in FIG. 2.

Figure 11:
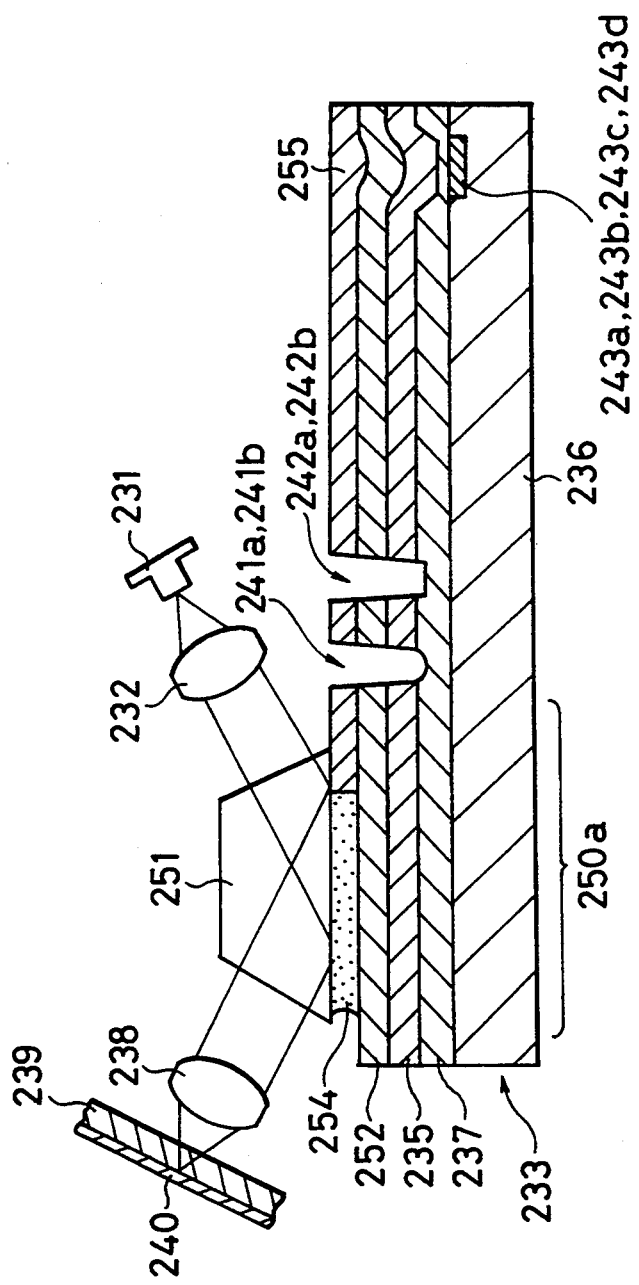
FIG. 11 is a cross-sectional view showing a focal point position detector in accordance with a fourth embodiment of the present invention.

FIG. 11 shows a focal point position detector in accordance with a fourth embodiment of the present invention.

In this fourth embodiment, the construction of a coupling section 250a is different from that in the third embodiment shown in FIGS. 9 and 10. The other constructional portions are basically similar to those in the third embodiment shown in FIGS. 9 and 10. Accordingly, the construction of the coupling section 250a will next be described.

A buffer layer 237, an optical waveguide layer 235, a gap adjusting layer 252 and a clad layer 255 are laminated with each other on a substrate 236 of a waveguide element 233. The clad layer 255 is composed of a dielectric layer having an opening portion. A prism 251 is arranged on the clad layer 255 through an adhesive layer 254 such that the opening portion of the clad layer 255 is filled with the adhesive layer 254. Thus, the clad layer 255 and the prism 251 are adhered to each other through the adhesive layer 254.

Light is incident to the coupling section 250a through a collimator lens 232 from a light source 231. This light is then incident to the opening portion of the clad layer 255 through the prism 251. A portion of this incident light is reflected on a bottom face of the prism 251. The other portion of this incident light is incident to the optical waveguide layer 235 and is wave-guided and emitted to the prism 251 by decoupling. The light portion reflected on the bottom face of the prism 251 and the light portion emitted to the prism 251 by decoupling are emitted together toward an objective lens 238.

When light reflected on an optical recording medium 240 is incident to the coupling section 250a through the objective lens 238, a portion of this light is reflected on the bottom face of the prism 251 and the other portion of this light is wave-guided to the optical waveguide layer 235 on the right-hand side in FIG. 11. The other light portion is wave-guided without decoupling the other light portion from the prism 251 since the clad layer 255 is arranged.

In this fourth embodiment, the quantity of light coupled and wave-guided by the optical waveguide layer 235 can be adjusted by controlling a thickness of the gap adjusting layer 252. Further, the metallic layer 253 in the third embodiment is replaced with the clad layer 255 composed of a dielectric layer having a refractive index lower than that of the optical waveguide layer 235. Accordingly, the waveguide element 233 can be constructed by an element having a reduced waveguide loss.

As mentioned above, in accordance with a first structure of the present invention, a focal point position detector has a light source for emitting light; an optical system for converging light from the light source to an optical recording medium; a coupler for coupling light from the optical recording medium thereto; a waveguide concave mirror for converging light from the coupler; a waveguide convex mirror for slightly reducing a converging degree of light from the waveguide concave mirror; and photodetectors for receiving light from the waveguide convex mirror. The focal point position detector is constructed such that the coupler, the waveguide concave and convex mirrors and the photodetectors are integrally formed on a substrate.

Accordingly, an optical system for detecting the position of a focal point can be constructed by combining two waveguide mirrors with photodetectors. Therefore, no focal point position of the converged light beam is changed irrespective of a change in wavelength of light emitted from the light source. Further, it is possible to prevent detecting sensitivity of the focal point position from being reduced by the change in focal point position of the converged light beam and prevent an increase in noise.

The coupler on an waveguide element is separated from the other optical system and the two waveguide mirrors are combined with each other. Accordingly, a degree of freedom with respect to setting of the focal point position of the converged light beam is increased so that the entire focal point position detector can be made compact.

Further, in the optical system, the first and second waveguide mirrors are respectively constructed by concave and convex mirrors. Accordingly, the focal point position detector is constructed by a telescopic structure having a focal length longer than a distance from the optical system to the focal point position. Thus, the focal length of the optical system can be increased in comparison with a length of the optical system.

In this structure, the change in focal point position of the light beam is increased in accordance with a shift in position between the optical recording medium and the optical system for converging light from the light source onto the optical recording medium. Accordingly, the detecting sensitivity of the focal point position is improved in the case of the same size of the optical system. Further, it is possible to reduce an optical path of the optical system by the telescopic structure so that it is advantageous to integrate and make the focal point position detector compact.

In accordance with a second structure of the present invention, two sets of the waveguide concave and convex mirrors and two sets of the photodetectors are symmetrically arranged to simultaneously detect a tracking error signal and a focal point error signal in the focal point position detector having the first structure.

In accordance with a third structure of the present invention, the coupler in the first structure is replaced with a coupling section. Accordingly, similar to the first structure of the present invention, an optical system for detecting the position of a focal point can be constructed by combining two waveguide mirrors with photodetectors. Therefore, no focal point position of the converged light beam is changed irrespective of a change in wavelength of light emitted from the light source. Further, it is possible to prevent detecting sensitivity of focal point position from being reduced by the change in focal point position of the converged light beam and prevent an increase in noise.

The coupling section on an waveguide element is separated from the other optical system and the two waveguide mirrors are combined with each other. Accordingly, a degree of freedom with respect to setting of the focal point position of the converged light beam is increased so that the entire focal point position detector can be made compact.

Further, in the optical system, the first and second waveguide mirrors are respectively constructed by concave and convex mirrors. Accordingly, the focal point position detector is constructed by a telescopic structure having a focal length longer than a distance from a converging element to the focal point position. Thus, the focal length of the optical system can be increased in comparison with a length of the optical system.

In this structure, the change in focal point position of the light beam is increased in accordance with a shift in position between the optical recording medium and the optical system for converging light from the light source onto the optical recording medium. Accordingly, the detecting sensitivity of the focal point position is improved in the case of the same size of the optical system. Further, it is possible to reduce an optical path of the optical system by the telescopic structure so that it is advantageous to integrate and make the focal point position detector compact.

The coupling section is constructed such that the optical waveguide layer, a gap adjusting layer having a refractive index lower than that of the optical waveguide layer, and a partially removed metallic layer are laminated with each other, and a prism having a refractive index higher than that of the optical waveguide layer is adhered to the laminated layers through an adhesive layer having a refractive index higher than that of the optical waveguide layer.

Accordingly, it is possible to reduce a change in coupling efficiency of a waveguide caused by a change in wavelength of light from the light source. Further, it is possible to stably couple light to the waveguide with high accuracy in position in comparison with the normal prism coupler.

In a fourth structure of the present invention, the metallic layer is replaced with a clad layer composed of a dielectric layer having a refractive index lower than that of the optical waveguide layer in the focal point position detector having the third structure.

Accordingly, effects similar to those obtained in the third structure can be obtained in the fourth structure. Further, it is possible to prevent a portion of waveguide light from being absorbed and lost by the metallic layer. Accordingly, light can be efficiently wave-guided to the optical system for detecting the position of a focal point.

Figure 12:
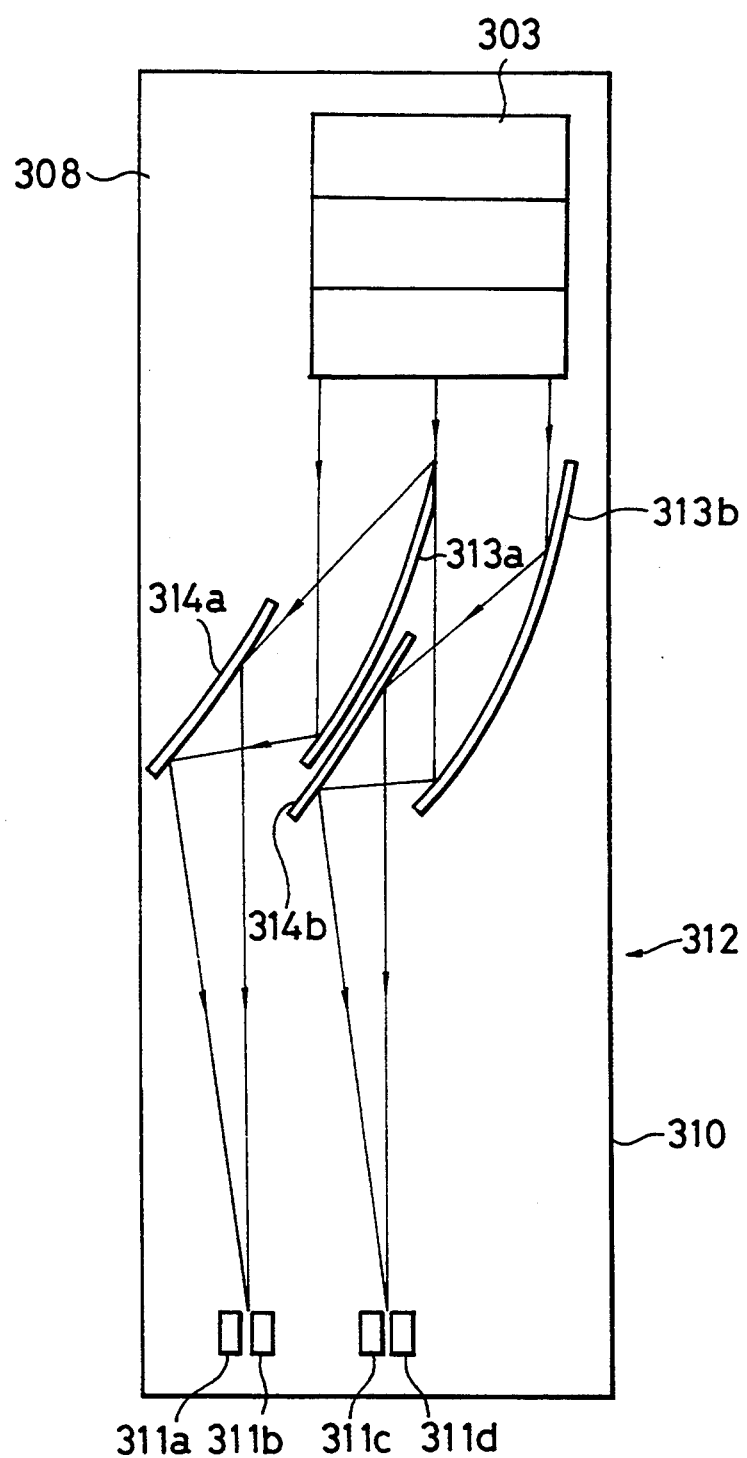
FIG. 12 is a plan view of an optical pickup disposed in an apparatus for recording and reproducing optical information in accordance with a fifth embodiment of the present invention.
Figure 14:
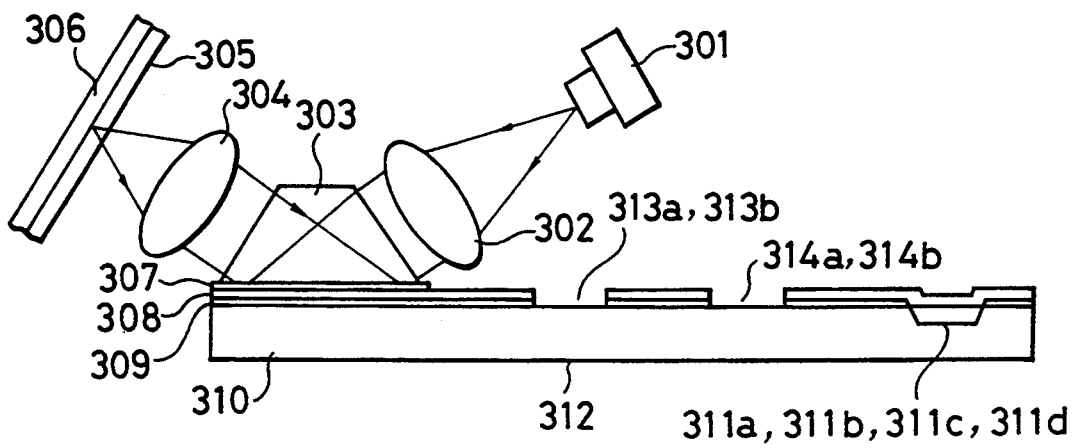
FIG. 14 is a side view of the optical pickup disposed in the apparatus for recording and reproducing optical information in accordance with the fifth embodiment of the present invention.

FIGS. 12 and 14 are respectively plan and side views of an optical pickup disposed in an apparatus for recording and reproducing optical information in accordance with a fifth embodiment of the present invention.

In FIGS. 12 and 14, light is emitted from a light source 301 and is changed to parallel light by a collimator lens 302. The parallel light is then incident to a trapezoidal prism coupler 303. The incident light is reflected on a bottom face of the prism coupler 303 and is converged by an objective lens 304 onto a recording medium layer 306 of an optical disk 305 as a medium for recording optical information. Return light reflected on the recording medium layer 306 again passes through the objective lens 304 and is again incident to the trapezoidal prism coupler 303.

A portion of the return light is coupled to an optical waveguide layer 308 through a gap layer 307. The coupled light is transmitted through the optical waveguide layer 308 and is incident to two waveguide concave mirrors 313a and 313b arranged in parallel with each other. This incident light is then divided into two light beams by these waveguide concave mirrors. The two light beams reflected and converged by the waveguide concave mirrors 313a and 313b are respectively incident onto waveguide convex mirrors 314a and 314b and are reflected on these waveguide convex mirrors. The reflected light beams are respectively received by photodetectors 311a, 311b and photodetectors 311c, 311d disposed in a substrate 310. The respective optical elements are arranged such that the light beams are respectively converged to an intermediate portion between the photodetectors 311a and 311b and an intermediate portion between the photodetectors 311c and 311d at a focusing time of the optical pickup.

The light source 301 desirably has good spatial and time coherences such as a semiconductor laser, various kinds of solid and gas lasers, an SHG light source, an LED, etc. Each of the collimator lens 302 and the objective lens 304 is constructed by a lens of a normal type, but may be constructed by an aspherical lens, a Fresnel lens, a distributing refractive index lens, other lenses, or a combination of these lenses. The prism coupler 303 is constructed by a trapezoidal prism coupler, but may be constructed by a triangular prism coupler.

In the waveguide element 312, the substrate 310 is constructed by a semiconductor substrate made of silicon, GaAs, etc. However, the substrate 310 may be constructed by glass, ceramics, a dielectric crystal, plastic, an organic material such as resin, etc. The optical waveguide layer 308 and the buffer layer 309 are formed by processing a transparent material at a wavelength of light emitted from the light source 301 using methods of evaporation, sputtering, CVD, coating, oxidation, diffusion, etc. It is necessary to set a refractive index of the buffer layer 309 to be lower than that of the optical waveguide layer 308. No buffer layer 309 is required when the substrate 310 is constructed by a transparent material and no loss of light absorbed into the substrate 310 is considered. The gap layer 307 may be formed by an air layer or a transparent material, but a refractive index of the gap layer 307 must be set to be lower than that of each of the trapezoidal prism coupler 303 and the optical waveguide layer 308. It is necessary to set the refractive index of the trapezoidal prism coupler 303 to be higher than that of the optical waveguide layer 308. A grating coupler can be similarly used instead of the trapezoidal prism coupler.

The waveguide concave mirrors 313a, 313b and the waveguide convex mirrors 314a, 314b can be formed by removing only the optical waveguide layer 308, or removing the optical waveguide layer 308 and a portion of the buffer layer 309 using methods of dry and wet etching, cutting, ion mealing, etc. Otherwise, the waveguide concave mirrors 313a, 313b and the waveguide convex mirrors 314a, 314b can be formed by diffusing a material having a low refractive index. When the waveguide concave mirrors 313a, 313b and the waveguide convex mirrors 314a, 314b are formed by the above removal, an end face of each of these mirrors may come in direct contact with an air layer and be coated with a metal having a high reflectivity, etc. Otherwise, a material having a low refractive index may be formed on this end face. In FIG. 14, the end face of each of the waveguide concave mirrors 313a, 313b and the waveguide convex mirrors 314a, 314b is set to be perpendicular to the optical waveguide layer 308, but may be set to be inclined with respect to the optical waveguide layer 308. Otherwise, this end face may be transversally formed in a tapered shape with respect to the optical waveguide layer 308.

For example, each of the photodetectors 311a, 311b and the photodetectors 311c, 311d is constructed by a PIN photodiode manufactured by impurity diffusion, ion implantation, etc. However, each of these photodiodes may be constructed by a photodiode of a Schottky type. When no substrate 310 is constructed by a semiconductor substrate, an α-Si photodiode, etc. can be used as each of these photodiodes.

In this embodiment, as can be seen from FIG. 12, the waveguide concave mirror 313a and the waveguide convex mirror 314a constitute one set or pair of waveguide mirrors. The waveguide concave mirror 313b and the waveguide convex mirror 314b also constitute another set or pair of waveguide mirrors. The waveguide concave mirrors 313a and 313b are of the same type and are arranged in parallel with each other. The waveguide convex mirrors 314a and 314b are of the same type and are arranged in parallel with each other. Namely, the relation in position between the waveguide concave mirror 313a and the waveguide convex mirror 314a is set to be equal to the relation in position between the waveguide concave mirror 313b and the waveguide convex mirror 314b. Accordingly, when a light beam incident to each of the waveguide mirrors is set to a parallel light beam, converging performances with respect to the two sets of waveguide mirrors are similarly changed in accordance with an error in manufacture of the waveguide mirrors in etching, etc. Therefore, no distance between the focal points of two light beams is easily changed.

Various kinds of signal detecting methods in the above optical pickup will next be described.

As shown in FIG. 12, when the recording medium layer 306 of the optical disk 305 is first located in a suitable focusing position of the objective lens 304, the trapezoidal prism coupler 303, the waveguide concave mirrors 313a, 313b, the waveguide convex mirrors 314a, 314b and the photodetectors 311a to 311d are arranged such that two light beams in the optical waveguide layer 308 of the waveguide element 312 are respectively converged to an intermediate portion between the photodetectors 311a and 311b and an intermediate portion between the photodetectors 311c and 311d.

When the recording medium layer 306 of the optical disk 305 located in the focusing position of the objective lens 304 is separated from the objective lens 304, a light beam incident to the waveguide element 312 is slightly converged excessively. Accordingly, focal point positions of the two light beams separated in the optical waveguide layer 308 by the waveguide concave mirrors 313a, 313b and the waveguide convex mirrors 314a, 314b are located before the photodetectors 311a to 311d.

When optical outputs of the photodetectors 311a, 311b, 311c and 311d are respectively set to A, B, C and D, inequalities B>A and C>D are formed. If a focal point error signal $$\Delta F=(A+D)-(B+C),$$

an inequality $\Delta F<0$ is formed.

In contrast to this, when the recording medium layer 306 approaches the objective lens 304 from the focusing position thereof, the light beam incident to the waveguide element 312 is slightly diverged excessively. Accordingly, focal point positions of the two light beams separated in the optical waveguide layer 308 by the waveguide concave mirrors 313a, 313b and the waveguide convex mirrors 314a, 314b are located backward from end faces of the photodetectors 311a to 311d. Therefore, inequalities A>B and D>C are formed so that the focal point error signal $\Delta F>0$ is formed.

An operation of the optical pickup is adjusted such that A=B and C=D are formed at a focusing time of the optical pickup shown in FIG. 12. Accordingly, $\Delta F=0$ is set at this focusing time.

Negative and positive values of $\Delta F$ are detected by electric circuits similar to those in FIG. 1 and are fed back to a controller for controlling the operation of the optical pickup. A position of the objective lens 304 is then adjusted by the operation of an unillustrated actuator controlled by this controller such that $\Delta F=0$ is formed. Otherwise, a position of the entire optical pickup is adjusted by the operation of an unillustrated actuator controlled by this controller such that $\Delta F=0$ is formed. Thus, it is possible to automatically perform a focusing operation of the optical pickup.

A tracking error signal $\Delta T$ is set as follows.

$$\Delta T=(A+B)-(C+D)$$

In this case, negative and positive values of $\Delta T$ are detected by a push-pull method, etc. and are fed back to the controller. The position of the objective lens 304 or the entire optical pickup is adjusted by the operation of an unillustrated actuator, etc. controlled by the controller such that $\Delta T=0$ is formed. Thus, it is possible to automatically perform a tracking operation of the optical pickup.

A recording signal S can be detected by the following formula.

$$S=A+B+C+D$$

The focal point error signal, the tracking error signal and the recording signal are detected by the above detecting methods. As mentioned above, in this embodiment, two sets of waveguide optical systems of the same type are constructed by the waveguide concave mirrors 313a, 313b and the waveguide convex mirrors 314a, 314b arranged in parallel with each other. Accordingly, shifts in focal point positions of two light beams caused by an error in manufacture of the optical pickup are approximately equal to each other since the waveguide optical systems are of the same type. Shifting directions of the two light beams are also approximately equal to each other. Accordingly, no distance between focal points of the two light beams is greatly changed by the error in manufacture of the optical pickup. Therefore, when a focal point error signal is detected, an offset as a shift in position of an origin at a focusing time of the optical pickup can be reduced by slightly adjusting an angle between the direction of an optical axis and a light beam incident to the optical waveguide layer 308.

The features of the optical pickup in this fifth embodiment will next be described. In this embodiment, each of the waveguide concave mirrors 313a and 313b is used as a first mirror. Each of the waveguide convex mirrors 314a and 314b is used as a second mirror. Accordingly, the optical system is constructed by a telescopic structure having a focal length longer than a distance from the optical system to the position of a focal point. Therefore, the focal length of the optical system can be increased in comparison with a length of the optical system. Thus, it is possible to improve the detecting sensitivity of a focal point position in comparison with the general optical system using the same objective lens and having the same size.

Figure 13:
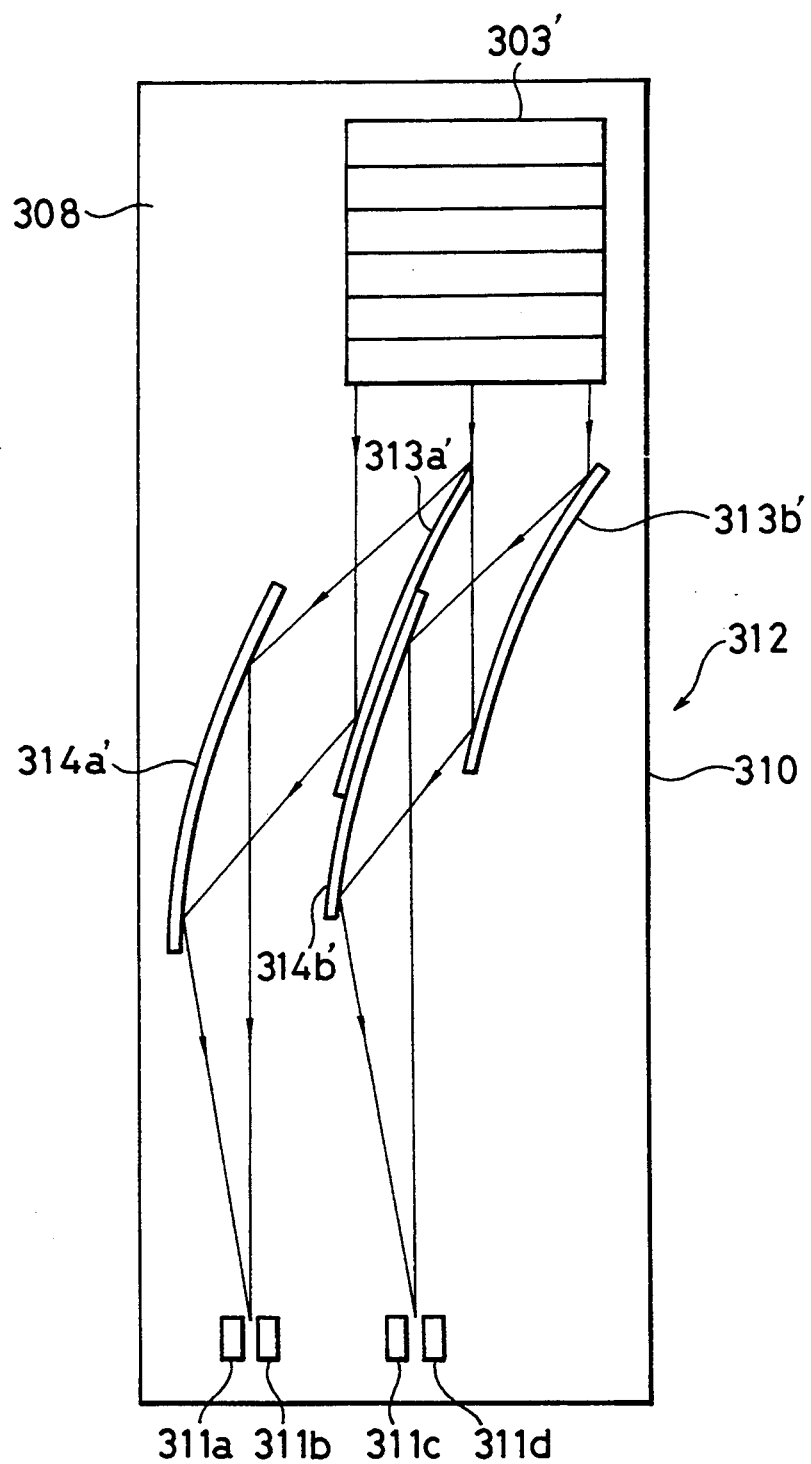
FIG. 13 is a plan view of an optical pickup disposed in an apparatus for recording and reproducing optical information in accordance with a sixth embodiment of the present invention.
Figure 15:
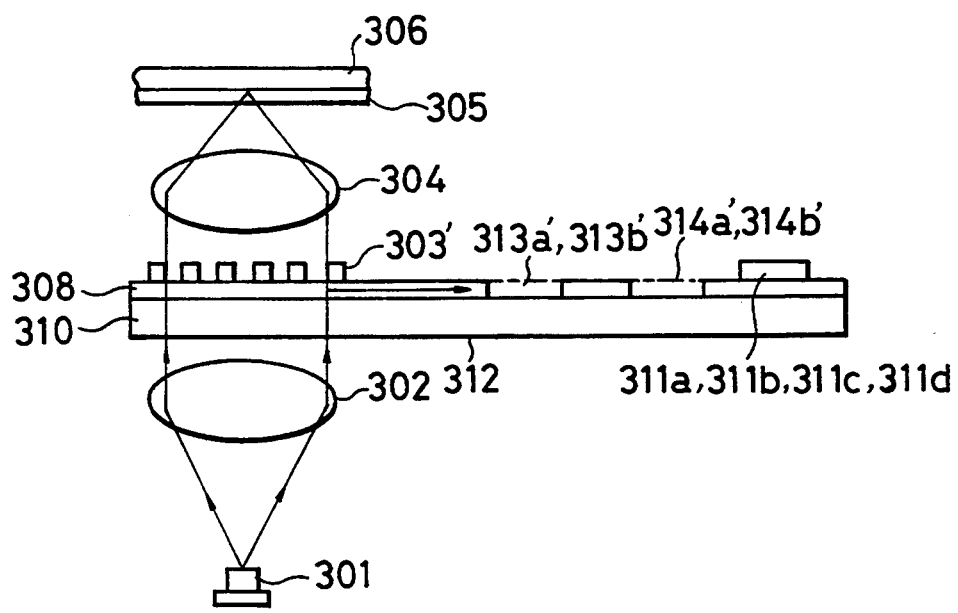
FIG. 15 is a side view of the optical pickup disposed in the apparatus for recording and reproducing optical information in accordance with the sixth embodiment of the present invention.

An optical pickup disposed in an apparatus for recording and reproducing optical information in accordance with a sixth embodiment of the present invention will next be described. FIGS. 13 and 15 are respectively plan and side views of the optical pickup in the sixth embodiment of the present invention.

The construction of the optical pickup shown in FIG. 13 is close to that shown in FIG. 12. However, in this embodiment, waveguide convex mirrors 313a' and 313b' are first arranged and waveguide concave mirrors 314a' and 314b' are next arranged. This optical structure is effectively used to reduce comatic aberration. Further, a change in diameter of a focal point spot caused by a change in incident angle of light is reduced so that a focal point error signal can be stably detected. Similar to the fifth embodiment shown in FIG. 12, two sets of waveguide mirrors of the same type are combined with each other. In this sixth embodiment, a grating coupler 303' is used instead of the trapezoidal prism coupler shown in FIGS. 12 and 14.

As shown in FIG. 15, a transparent substrate is used as a substrate 310. Light is emitted from a light source 301 and is changed to a parallel light beam by a collimator lens 302. Thereafter, the parallel light beam is transmitted through a waveguide element 312 from a lower side of the substrate 310. The parallel light beam is then converged by an objective lens 304 onto a recording medium 306 of an optical disk 305. Return light reflected on the recording medium 306 is coupled to the optical waveguide layer 308 by the grating coupler 303'.

Each of photodetectors 311a to 311d is constructed by an $\alpha$-Si photodiode of a loading type.

In this sixth embodiment, it is not necessary to dispose the gap layer 307 and the buffer layer 309 shown in FIG. 14. Various kinds of signal detecting methods and a method for manufacturing the respective constructional elements are similar to those in the fifth embodiment shown in FIGS. 12 and 14. The grating coupler 303' is of an equal distance loading type as one example, but may be formed in a curving shape at an unequal distance. Further, it is possible to use a grating coupler of a blazing type or a volume phase type.

In the fifth and sixth embodiments shown in FIGS. 12 and 13, the waveguide convex mirrors 313a', 313b' or 314a, 314b are used, but waveguide plane mirrors may be used. Further, waveguide concave mirrors may be used instead of these waveguide convex mirrors. Namely, two sets of waveguide mirrors may be constructed by two pairs of waveguide concave mirrors. Otherwise, one pair of waveguide mirrors with respect to the two sets of waveguide mirrors may be constructed by waveguide plane mirrors.

One set of photodetectors 311a and 311b is constructed by a pair of photodiodes of a parallel type. Another set of photodetectors 311e and 311d is also constructed by a pair of photodiodes of a parallel type. The optical pickup may be arranged such that one set of photodetectors interrupts a light beam and another set of photodetectors receives the remaining light beam. In this case, it is desirable to arrange the two sets of photodetectors in the same manner.

As mentioned above, in an apparatus for recording and reproducing optical information in a fifth structure of the present invention, light is emitted from a light source and is converged to an optical information recording medium through an optical system. Return light reflected on the optical information recording medium is coupled to an optical waveguide by a coupler. Waveguide light from the coupler is divided into two light portions by two sets of waveguide mirror pairs of the same type arranged in parallel with each other. The two light portions are converged by these waveguide mirrors and are respectively received by photodetectors. Accordingly, a shift in position of a converging point caused by a change in waveguide of light from the light source and an influence of this shift on a focal point error signal can be reduced in comparison with the general optical information recording and reproducing apparatus using a grating coupler for converging light, thereby reducing signal noises.

Further, the two sets of waveguide mirror pairs of the same type are arranged as a waveguide optical system in parallel with each other. No distance between the focal points of two light beams caused by an error in forming position of each of the waveguide mirrors is easily changed in comparison with an optical arrangement with axial symmetry as in the general optical information recording and reproducing apparatus mentioned above. Accordingly, an offset as a shift in position of an origin in the optical system is reduced in comparison with the general optical information recording and reproducing apparatus when a focal point error signal is detected. Therefore, it is possible to increase a tolerance for the error in forming position of each of the waveguide mirrors so that cost of the optical information recording and reproducing apparatus can be reduced.

The coupler, the optical waveguide, the waveguide mirrors and the photodetectors are integrally formed on a substrate so that an optical pickup section can be made compact.

In a sixth structure of the present invention, a focal point position detecting signal, a tracking error signal and a recording signal can be simultaneously detected by two sets of waveguide mirror pairs and photodetectors. Accordingly, it is possible to provide an apparatus for recording and reproducing optical information having an optical pickup in which noises are reduced and a tolerance for an error in manufacture of the optical pickup is increased and cost thereof is reduced.

Figure 16:
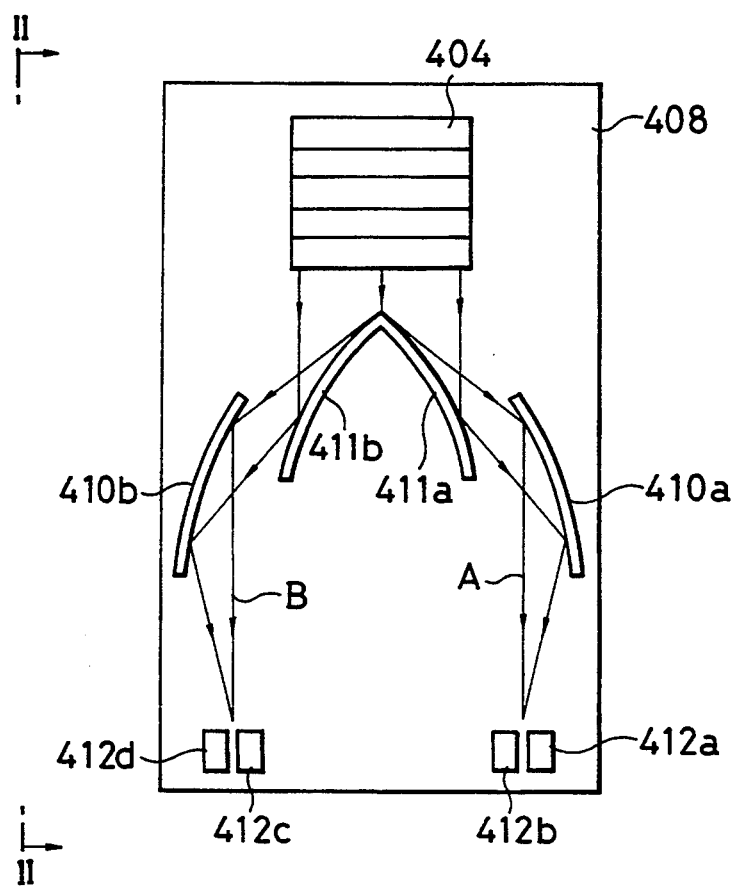
FIGS. 16 and 17 are respectively plan and side views for explaining an apparatus for recording and reproducing optical information in accordance with a seventh embodiment of the present invention.
Figure 17:
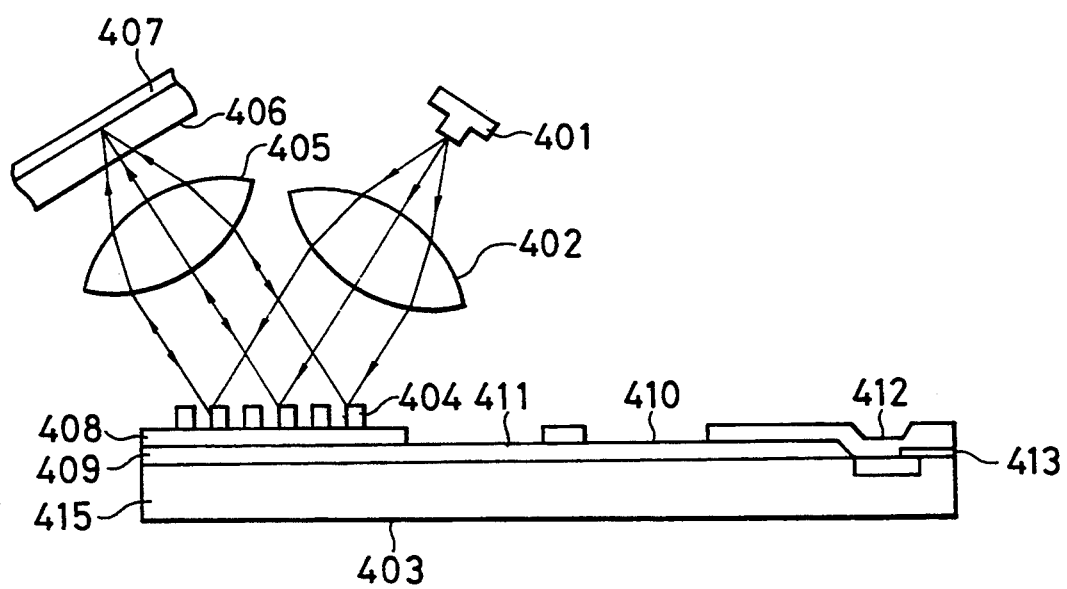

FIGS. 16 and 17 are respectively plan and side views for explaining the construction of an apparatus for recording and reproducing optical information in accordance with a seventh embodiment of the present invention. The side view of FIG. 17 is seen from a direction of line II—II in FIG. 16.

In FIG. 17, light is emitted from a light source 401 and is changed to parallel light by a collimator lens 402. The parallel light is then incident to a grating coupler 404. An optical waveguide layer 408 is formed on a substrate 403. The incident light is reflected on a surface of the optical waveguide layer 408 and a boundary face between the substrate 403 and a buffer layer 409. The reflected light is then converged onto a recording medium 407 by an objective lens 405 through a transparent substrate 406. Return light reflected on a face of the recording medium 407 is again converged through the objective lens 405 and is coupled to an optical waveguide layer 408 by the grating coupler 404 formed on a waveguide element 415.

As shown in FIG. 16, parallel light coupled and wave-guided to the optical waveguide layer 408 by the grating coupler 404 is divided into two light portions by waveguide parabolic mirrors 411a and 411b. These two light portions are changed to divergent light beams by these waveguide parabolic mirrors 411a and 411b. The divergent light beams are respectively converged by waveguide elliptical mirrors 410a and 410b to an intermediate portion between photodetectors 412a and 412b and an intermediate portion between photodetectors 412c and 412d.

The light source 401 desirably has good spatial and time coherences and may be constructed by a semiconductor laser, various kinds of gas and solid lasers, an LED, etc. Each of the collimator lens 402 and the objective lens 405 is constructed by a lens of a normal type, but may be constructed by combining lenses with each other. Further, each of the collimator lens 402 and the objective lens 405 may be constructed by combining an aspherical lens, a Fresnel lens, a distributing refractive index lens and other lenses with each other.

The grating coupler 404 is of an equal distance loading type, but may be formed in a curving shape at an unequal distance. Further, the grating coupler 404 may be of a blazing type or a volume phase type instead of the simple loading type. A prism coupler of a trapezoidal type can be also used instead of the grating coupler 404.

In this seventh embodiment, the substrate 403 of the waveguide element 415 is constructed by a semiconductor substrate made of silicon, GaAs, etc. However, this substrate 403 may be constructed by a dielectric substance such as ceramics and glass, an organic material such as plastic resin, etc. The buffer layer 409 and the optical waveguide layer 408 are formed by processing a transparent material at a wavelength of light emitted from the light source using methods of evaporation, sputtering, CVD, coating, oxidation, diffusion, etc. It is necessary to set a refractive index of the buffer layer 409 to be lower than that of the optical waveguide layer 408. No buffer layer 409 is necessarily required if no loss of light caused by the substrate 403 is considered.

In this embodiment, each of the photodetectors 412a to 412d is constructed by a photodiode as one example manufactured by impurity diffusion, ion implantation, etc. Each of the photodetectors 412a to 412d may be constructed by a photodiode of a Schottky type. An α-Si photodiode can be used as each of the photodetectors 412a to 412d when no substrate 403 is constructed by a semiconductor substrate. The waveguide parabolic mirrors 411a and 411b and the waveguide elliptical mirrors 410a and 410b can be formed by removing only the optical waveguide layer 408, or removing the optical waveguide layer 408 and a portion of the buffer layer 409 using dry and wet etching, and cutting methods, etc. Otherwise, the waveguide parabolic mirrors 411a and 411b and the waveguide elliptical mirrors 410a and 410b can be formed by diffusing a material having a low refractive index.

When the waveguide parabolic mirrors 411a and 411b and the waveguide elliptical mirrors 410a and 410b are formed by the above removal, an end face 413 of the optical waveguide layer 408 may come in direct contact with an air layer. Otherwise, this end face 413 may be coated with a metal having a high reflectivity, etc. A reflecting film composed of many dielectric layers may be formed on this end face 413. Further, a material having a refractive index lower than that of the optical waveguide layer 408 may be formed on the end face 413. Arrangements of the waveguide parabolic mirrors 411a and 411b and the waveguide elliptical mirrors 410a and 410b will be described later.

A signal detecting method will next be described. As shown in FIG. 16, when the optical recording medium 407 is located in a suitable focusing position of the objective lens 405, the grating coupler 404, the waveguide mirrors 410a, 410b, 411a, 411b, and the photodetectors 412a, 412b, 412c, 412d are arranged such that two light beams in the optical waveguide layer 408 are respectively converged to an intermediate portion between the photodetectors 412a and 412b and an intermediate portion between the photodetectors 412c and 412d.

Figure 20:
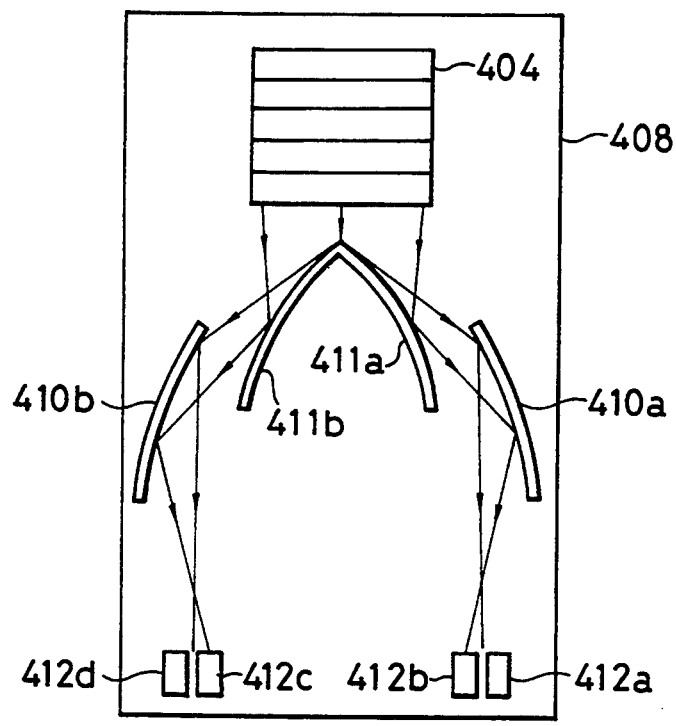
FIGS. 20 and 21 are views for explaining an operation of the optical information recording and reproducing apparatus in the seventh embodiment of the present invention shown in FIGS. 16 and 17.

When the recording medium 407 located in the focusing position of the objective lens 405 is separated from the objective lens 405, a light beam incident to the waveguide element 415 is slightly converged excessively. Accordingly, as shown in FIG. 20, the focal point positions of two light beams separated in the optical waveguide layer 408 are located before the photodetectors 412a, 412b, 412c and 412d. When optical outputs of the photodetectors 412a, 412b, 412c and 412d are respectively set to A, B, C and D, inequalities $B>A$ and $C>D$ are formed.

In FIG. 20, when a focal point error signal $\Delta F=(A+D)-(B+C)$, an inequality $\Delta F<0$ is formed.

Figure 21:
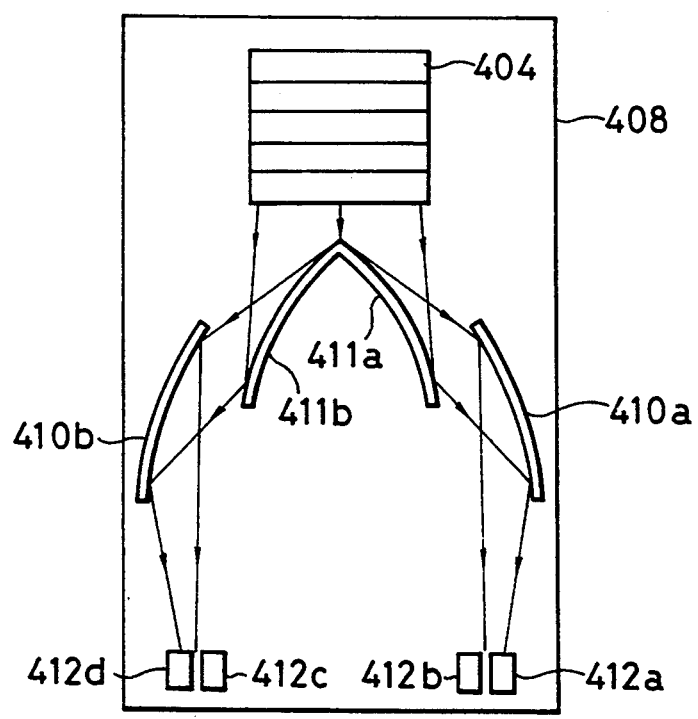

When the optical recording medium 407 approaches the objective lens 405 from the focusing position thereof, the light beam incident to the waveguide element 415 is slightly diverged excessively. Accordingly, as shown in FIG. 21, focal point positions of the two light beams separated in the optical waveguide layer 408 are located backward from end faces of the photodetectors 412a, 412b, 412c and 412d. Therefore, inequalities $A>B$ and $D>C$ are formed so that $\Delta F>0$ is formed. Namely, the arrangement of an optical system is adjusted such that $A=B$ and $C=D$ are formed at a focusing time of the objective lens 405 in FIG. 16, thereby forming $\Delta F=0$. Therefore, a focusing operation of the optical system can be automatically performed by adjusting the position of the objective lens 405 by an actuator, or adjusting the position of an entire optical pickup by an unillustrated actuator such that $\Delta F=0$ is formed by changing the value of $\Delta F$ to a positive or negative value.

When a tracking error signal $\Delta T$ is set to $\Delta T=(A+B)-(C+D)$, a tracking operation of the optical system can be automatically performed by adjusting the position of the objective lens 405 or the entire optical pickup by an actuator, etc. such that $\Delta T=0$ is formed by changing the value of $\Delta T$ to a negative or positive value using a push-pull method. A recording signal S is set to $S=A+B+C+D$.

Figure 19:
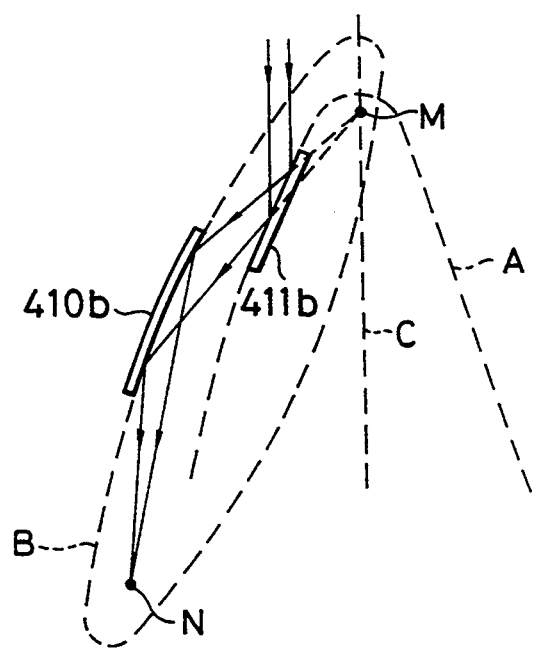
FIG. 19 is a view showing the relation in position between a waveguide parabolic mirror and a waveguide elliptical mirror.

The relation in position between the waveguide parabolic mirrors 411a, 411b and the waveguide elliptical mirrors 410a, 410b in the waveguide element 415 will next be explained with reference to FIG. 19.

First, the waveguide parabolic mirror 411b is preferably arranged such that the symmetrical axis C of a parabola A including a shape of this parabolic mirror 411b is parallel to a coupled light beam from the grating coupler 404 at a focusing time of the optical system. Next, the waveguide elliptical mirror 410b is preferably arranged along a portion of an ellipse B. This ellipse B has one focal point equal to a focal point M of the parabola A. Another focal point N of the ellipse B is located in an intermediate portion between the photodetectors 412c and 412d. In this case, an incident light beam parallel to the symmetrical axis of the parabola A can be converged at the focal point N without spherical aberration.

As mentioned above, spherical aberration of the optical system can be reduced by the above optical arrangement. The waveguide parabolic mirror 411b is used as a convex mirror and the waveguide elliptical mirror 410b is used as a concave mirror. Accordingly, the optical system can be made compact in comparison with an optical system formed by combining only concave mirrors with each other in the case of the same combined focal length. Further, a position of the focal point N can be considerably selected freely since the waveguide parabolic and elliptical mirrors 411b and 410b are used. The waveguide parabolic and elliptical mirrors 411a and 410a are symmetrically arranged with respect to the waveguide parabolic and elliptical mirrors 411b and 410b.

In accordance with this optical arrangement, it is possible to increase the incident angle of a light beam incident to each of the waveguide mirrors. Accordingly, it is possible to construct an optical system of waveguide mirrors using total reflection. Further, no material such as a metal having a high reflectivity is necessarily formed on each of end faces of the parabolic mirrors 411a, 411b and the elliptical mirrors 410a, 410b. Further, in this optical arrangement, there is a possibility that spherical aberration can be reduced by using the two waveguide mirrors and comatic aberration can be reduced by suitably selecting arrangement and curvature of reflecting mirrors, etc.

As shown in FIG. 16, a principal ray of the incident light beam from the grating coupler 404 is constructed by light passing through a center of this light beam. The optical system is preferably arranged such that this principal ray is divided into two light portions A and B parallel to each other. In such an optical arrangement, focal points of the two light beams are respectively located on the light portions h and B at any time. Accordingly, no distance between the focal points of the two light beams is almost changed so that it is easy to correct a shift in inclination from an optical axis of the incident light beam.

An apparatus for recording and reproducing optical information in accordance with an eighth embodiment of the present invention will next be described in detail with reference to FIG. 18. In the seventh embodiment shown in FIGS. 16 and 17, light emitted from the light source 401 passes through the collimator lens 402 and is once reflected on the waveguide element 415. However, in this eighth embodiment, a parallel light beam is incident to an objective lens 405 through a beam splitter 414. Return light is again separated by the beam splitter 414 and is then incident to a waveguide element 415. Such a structure is different from that in the seventh embodiment.

Similar to the seventh embodiment shown in FIGS. 16 and 17, various kinds of signals can be obtained from the light beam incident to the waveguide element 415. The beam splitter 414 may be of a half mirror type. A polarizing beam splitter and a ¼ wavelength plate may be additionally arranged between the beam splitter 414 and the objective lens 405. In this case, light utilizing efficiency is improved in comparison with that in the seventh embodiment. In this eighth embodiment, a prism coupler can be used as the grating coupler 404.

Figure 18:
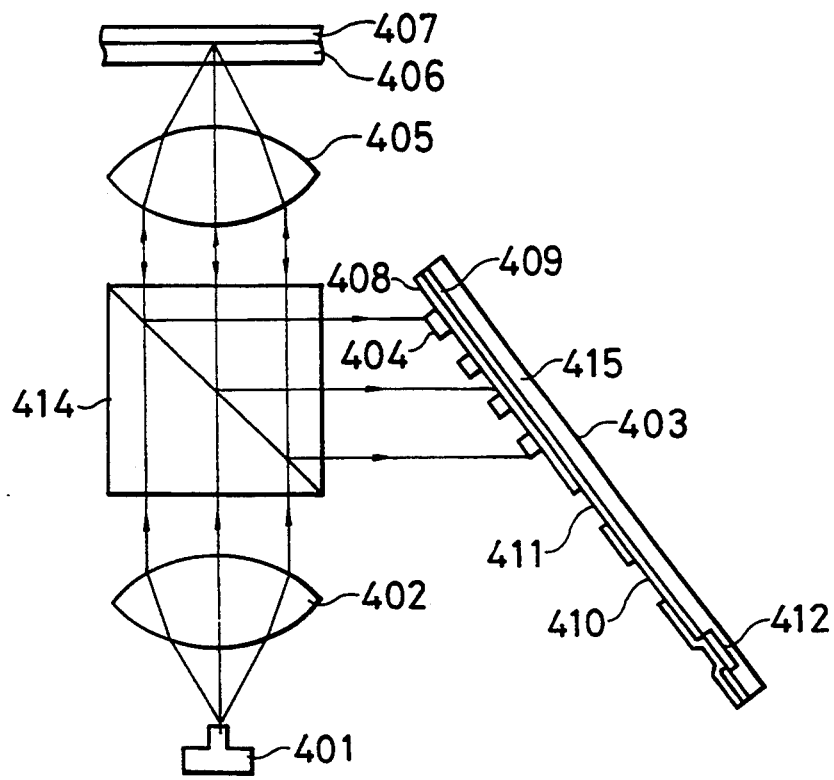
FIG. 18 is a plan view for explaining an apparatus for recording and reproducing optical information in accordance with an eighth embodiment of the present invention.

In the seventh and eighth embodiments shown in FIGS. 16 to 18, the parabolic mirrors 411a, 411b and the elliptical mirrors 410a, 410b are used as waveguide mirrors. However, spherical, hyperbolic and aspherical mirrors close to the parabolic and elliptical mirrors can be used if it is not necessary to completely correct spherical aberration. When incident light is set to parallel and divergent light, it is necessary to construct at least one of the two waveguide mirrors (i.e., the parabolic and elliptical waveguide mirrors) as a concave mirror. In contrast to this, when the incident light is set to convergent light, both the two waveguide mirrors may be constructed by combining plane mirrors or convex mirrors having small curvature with each other.

In the seventh and eighth embodiments shown in FIGS. 16 to 18, if no tracking error detecting signal is required, it is sufficient to dispose one of the waveguide parabolic mirrors 411a, 411b and one of the waveguide elliptical mirrors 410a, 410b in the waveguide element 415 shown in FIG. 17. Further, in this case, it is also sufficient to dispose a pair of photodetectors 412. For example, in the case of only the right-hand structure shown in FIG. 15, a focal point error signal ΔF is set to ΔF=A−B and a recording signal S is set to S=A+B.

Further, the photodetectors 412a and 412b are not necessarily arranged as a pair in parallel with each other and the photodetectors 412c and 412d are not necessarily arranged as a pair in parallel with each other. For example, it is considered to use a structure in which one of photodetectors interrupts and detects a portion of a light beam in the vicinity of a focal point and the other of the photodetectors detects the remaining light beam portion.

As mentioned above, in accordance with a seventh structure of the present invention, an optical system for detecting the position of a focal point is constructed by combining two waveguide mirrors with each other. Accordingly, no focal point position of the optical system is changed irrespective of a change in wavelength of light emitted from a light source so that no detecting sensitivity of the focal point position is reduced. A coupler on a waveguide element is separated from the other optical system and the two waveguide mirrors are combined with each other. Accordingly, a degree of freedom with respect to setting of the focal point position is increased and it is easy to deform the arrangement of the optical system and make the optical system compact.

In an eighth structure of the present invention, the two waveguide mirrors are constructed by combining waveguide parabolic and elliptical mirrors with each other. Accordingly, in addition to the effects obtained in the seventh structure, it is possible to reduce various kinds of aberrations such as spherical and comatic aberrations, thereby improving the detecting sensitivity of the focal point position.

In a ninth structure of the present invention, the optical system is arranged such that a principal ray of a light beam incident to the waveguide mirrors is divided into two light portions and these two light portions are parallel to each other. Accordingly, it is easy to adjust a distance between two focal points of the above waveguide mirrors when an incident angle of the incident light beam is different from a set angle.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focal point position detector comprising:
   a light source for emitting light;
   an optical system for converging light from the light source to an optical recording medium;
   a coupler for coupling light from the optical recording medium thereto;
   a waveguide concave mirror for converging light from the coupler;
   a waveguide convex mirror for slightly reducing a converging degree of light from the waveguide concave mirror; and
   photodetectors for receiving light from the waveguide convex mirror;
   the focal point position detector being constructed such that said coupler, said waveguide concave and convex mirrors and said photodetectors are integrally formed on a substrate.

2. A focal point position detector as claimed in claim 1, wherein two sets of said waveguide concave and convex mirrors and two sets of said photodetectors are symmetrically arranged to simultaneously detect a tracking error signal and a focal point error signal.

3. A focal point position detector as claimed in claim 1, wherein said coupler is constructed as a coupling section for coupling light from said optical recording medium to an optical waveguide layer and converging the light coupled and wave-guided by the optical waveguide layer onto the waveguide concave mirror; and
   said coupling section is constructed such that said optical waveguide layer, a gap adjusting layer having a refractive index lower than that of said optical waveguide layer, and a partially removed metallic layer are laminated with each other, and a prism having a refractive index higher than that of said optical waveguide layer is adhered to said laminated layers through an adhesive layer having a refractive index higher than that of said optical waveguide layer.

4. A focal point position detector as claimed in claim 3, wherein said metallic layer is constructed as a clad layer composed of a dielectric layer having a refractive index lower than that of said optical waveguide layer.

5. An apparatus for recording and reproducing optical information and having an optical pickup, said optical pickup comprising:

a light source;

an optical system for converging light from the light source to an optical information recording medium;

an optical waveguide;

a coupler for coupling return light reflected on the optical information recording medium to the optical waveguide;

two sets of waveguide mirror pairs for converging waveguide light from the coupler; and photodetectors for receiving light from each of the two sets of waveguide mirror pairs;

the optical pickup being constructed such that said two sets of waveguide mirror pairs are of the same type and are arranged in parallel with each other, and the coupler, the optical waveguide, the waveguide mirrors and the photodetectors are integrally formed on a substrate.

6. An apparatus for recording and reproducing optical information as claimed in claim 5, wherein a focal point position detecting signal, a tracking error signal and a recording signal are simultaneously detected by the two sets of waveguide mirror pairs and the photodetectors.

7. An apparatus for recording and reproducing optical information, comprising;

a light source;

an optical system for transmitting light emitted from the light source;

an optical waveguide;

a coupler for coupling the transmitted light to the optical waveguide;

two waveguide mirrors arranged such that reflected light from said coupler is continuously reflected on the waveguide mirrors; and a photodetector for detecting the light reflected on the waveguide mirrors, the coupler, the optical waveguide, the waveguide mirrors and the photodetector being integrally formed on the same substrate, each of said two waveguide mirrors comprising a parabolic mirror or an elliptical mirror.

8. An apparatus for recording and reproducing optical information as claimed in claim 7, wherein the waveguide parabolic mirror is constructed by a convex mirror and the waveguide elliptical mirror is constructed by a concave mirror.

9. An apparatus for recording and reproducing optical information as claimed in claim 7, wherein the two waveguide mirrors comprise a combination of a convex mirror and a concave mirror, each of said convex mirror and said concave mirror comprising a parabolic mirror or an elliptical mirror.

10. An apparatus for recording and reproducing optical information, comprising:

a light source;

an optical system for transmitting light emitted from the light source;

a two-dimensional optical waveguide;

a coupler for coupling the transmitted light to the two-dimensional optical waveguide;

a first two-dimensional waveguide mirror arranged so as to reflect the light from said coupler;

a second two-dimensional waveguide mirror, arranged independently of the first two-dimensional waveguide mirror, to reflect the light reflected from the first two-dimensional waveguide mirror; and a photodetector for detecting the light reflected on the second two-dimensional waveguide mirror;

the coupler, the two-dimensional optical waveguide, the two-dimensional first waveguide mirror, the second two-dimensional waveguide mirror and the photodetector being integrally formed on the same substrate.

11. An apparatus for recording and reproducing optical information as claimed in claim 10, wherein said first and second two-dimensional waveguide mirrors divide the light from said coupler into two light portions which are parallel to each other.

12. An apparatus for recording and reproducing optical information as claimed in claim 10, wherein said two-dimensional optical waveguide comprises a two-dimensional optical waveguide layer and wherein the light reflected from said first and second two-dimensional waveguide mirrors is in the plane of said two-dimensional optical waveguide layer.

13. An apparatus for recording and reproducing optical information as claimed in claim 12, wherein said first and second two-dimensional waveguide mirrors divide the light from said coupler into two light portions which are parallel to each other.

14. An apparatus for recording and reproducing optical information as claimed in claim 10, wherein at least one of said first and second two-dimensional waveguide mirrors is a plane mirror.

* * * * *